United States Patent
Oi (12)

(10) Patent No.: US 9,821,366 B2
(45) Date of Patent: Nov. 21, 2017

(54) DISC BRAKE ROTOR AND METHOD OF MANUFACTURING DISC BRAKE ROTOR

(71) Applicant: SHIMANO INC., Sakai (JP)

(72) Inventor: Takeshi Oi, Sakai (JP)

(73) Assignee: SHIMANO INC., Sakai (JP)

( * ) Notice: Subject to any disclaimer, the term of this patent is extended or adjusted under 35 U.S.C. 154(b) by 219 days.

(21) Appl. No.: 14/292,928

(22) Filed: Jun. 1, 2014

(65) Prior Publication Data

US 2015/0343518 A1    Dec. 3, 2015

(51) Int. Cl.
| F16D 65/12 | (2006.01) |
| B21D 53/86 | (2006.01) |
| B21D 5/00 | (2006.01) |
| B23K 31/02 | (2006.01) |
| B21D 39/02 | (2006.01) |
| F16D 65/02 | (2006.01) |

(52) U.S. Cl.
CPC ............... *B21D 53/86* (2013.01); *B21D 5/00* (2013.01); *B23K 31/02* (2013.01); *F16D 65/123* (2013.01); *F16D 65/125* (2013.01); B21D 39/028 (2013.01); F16D 2065/1316 (2013.01); F16D 2065/1332 (2013.01); F16D 2065/1384 (2013.01); F16D 2200/003 (2013.01); F16D 2200/0017 (2013.01); F16D 2250/0092 (2013.01); Y10T 29/49828 (2015.01); Y10T 29/49948 (2015.01); Y10T 156/1002 (2015.01)

(58) Field of Classification Search
CPC ........... F16D 65/123; F16D 2065/1312; F16D 2065/1316; F16D 2065/1384
See application file for complete search history.

(56) References Cited

U.S. PATENT DOCUMENTS

| 3,486,218 A * | 12/1969 | Buyze ................. F16D 65/128 |
| | | 188/218 A |
| 4,010,831 A | 3/1977 | Reuter |
| 4,077,107 A | 3/1978 | Reuter |
| 5,553,371 A | 9/1996 | Uchino et al. |
| 6,223,574 B1 | 5/2001 | Teratoko et al. |
| 6,371,252 B1 | 4/2002 | Kanehisa |
| 6,974,275 B2 | 12/2005 | Nago et al. |
| 2004/0041007 A1 * | 3/2004 | Cremerius ............. B21D 53/16 |
| | | 228/173.6 |
| 2006/0144668 A1 | 7/2006 | Voegele |
| 2006/0185945 A1 * | 8/2006 | Greppi .................... F16D 65/12 |
| | | 188/218 XL |
| 2007/0080042 A1 * | 4/2007 | Keating ................ F16D 13/648 |
| | | 192/107 R |
| 2008/0302616 A1 * | 12/2008 | Kao ....................... F16D 65/127 |
| | | 188/218 XL |

(Continued)

FOREIGN PATENT DOCUMENTS

| CN | 103133574 | 6/2013 |
| DE | 2651729 | 6/1977 |

(Continued)

*Primary Examiner* — Bradley King

(74) *Attorney, Agent, or Firm* — Mori & Ward, LLP

(57) ABSTRACT

A method of manufacturing a disc brake rotor comprises preparing at least one elongated plate having a first end and a second end opposite to the first end in a longitudinal direction of the at least one elongated plate. The method comprises bending the at least one elongated plate in an arc shape.

28 Claims, 34 Drawing Sheets

(56) References Cited

U.S. PATENT DOCUMENTS

| | | | |
|---|---|---|---|
| 2010/0044171 A1* | 2/2010 | Hoshi | F16D 65/12 |
| | | | 188/218 XL |
| 2011/0006467 A1* | 1/2011 | Mizuno | B23K 15/0006 |
| | | | 267/161 |
| 2013/0133997 A1 | 5/2013 | Iwai et al. | |
| 2013/0168193 A1* | 7/2013 | Iwai | F16D 65/12 |
| | | | 188/218 XL |
| 2015/0314395 A1* | 11/2015 | Stueckler | B21C 37/0815 |
| | | | 228/173.6 |

FOREIGN PATENT DOCUMENTS

| | | |
|---|---|---|
| DE | 69513883 T2 | 6/2000 |
| DE | 10 2012 111 072 | 5/2013 |
| EP | 1609714 | 12/2005 |
| TW | 200904700 | 2/2009 |
| TW | M470900 U | 1/2014 |

* cited by examiner

DISC BRAKE ROTOR AND METHOD OF MANUFACTURING DISC BRAKE ROTOR

BACKGROUND OF THE INVENTION

Field of the Invention

The present invention relates to a disc brake rotor and a method of manufacturing the disc brake rotor.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a disc brake rotor.

SUMMARY OF THE INVENTION

In accordance with a first aspect of the present invention, a method of manufacturing a disc brake rotor comprises preparing at least one elongated plate having a first end and a second end opposite to the first end in a longitudinal direction of the at least one elongated plate. The method comprises bending the at least one elongated plate in an arc shape.

In accordance with a second aspect of the present invention, the method according to the first aspect is configured so that the bending of the at least one elongated plate includes bending the at least one elongated plate so that the first end comes close to the second end.

In accordance with a third aspect of the present invention, the method according to the second aspect further comprises coupling the first end and the second end of the at least one elongated plate together to provide a rotor body having an annular shape.

In accordance with a fourth aspect of the present invention, the method according to the third aspect is configured so that the coupling of the first end and the second end includes welding the first end and the second end together.

In accordance with a fifth aspect of the present invention, the method according to the fourth aspect further comprises machining a welded part at which the first end and the second end are welded together in the coupling of the first end and the second end.

In accordance with a sixth aspect of the present invention, the method according to the third aspect is configured so that the coupling of the first end and the second end includes bonding the first end and the second end together using adhesive.

In accordance with a seventh aspect of the present invention, the method according to the third aspect is configured so that the coupling of the first end and the second end includes coupling the first end and the second end together using a coupling member.

In accordance with an eighth aspect of the present invention, the method according to the first aspect is configured so that the preparing of the at least one elongated plate includes cutting a plate material in a predetermined shape to provide the at least one elongated plate.

In accordance with a ninth aspect of the present invention, the method according to the eighth aspect is configured so that the plate material has a first material layer, a second material layer, and a third material layer. The first material layer is made of a first material. The second material layer is made of a second material. The third material layer is made of a third material different from the first material and the second material and is provided between the first material layer and the second material layer.

In accordance with a tenth aspect of the present invention, the method according to the first aspect is configured so that the preparing of the at least one elongated plate includes forming a hub attachment portion configured to be attached to a bicycle hub assembly. The bending of the at least one elongated plate includes bending the at least one elongated plate so that the hub attachment portion is disposed on an inner peripheral part of the at least one elongated plate.

In accordance with an eleventh aspect of the present invention, the method according to the first aspect further comprises forming, on an inner peripheral part of the at least one elongated plate, a hub attachment portion configured to be attached to a bicycle hub assembly after the at least one elongated plate is bent in the arc shape.

In accordance with a twelfth aspect of the present invention, the method according to the first aspect further comprises forming a cooling fin part on an inner peripheral part of the at least one elongated plate.

In accordance with a thirteenth aspect of the present invention, the method according to the first aspect is configured so that the preparing of the at least one elongated plate includes forming at least one cutout on the at least one elongated plate. The bending of the at least one elongated plate includes bending the at least one elongated plate so that the at least one cutout is disposed on an outer peripheral part of the at least one elongated plate.

In accordance with a fourteenth aspect of the present invention, the method according to the first aspect is configured so that the preparing of the at least one elongated plate includes forming at least one through-hole on the at least one elongated plate.

In accordance with a fifteenth aspect of the present invention, a disc brake rotor comprises a rotor body having an annular shape. The rotor body comprises a main body extending in a circumferential direction of the disc brake rotor and including at least one first end and at least one second end opposite to the at least one first end in the circumferential direction.

In accordance with a sixteenth aspect of the present invention, the disc brake rotor according to the fifteenth aspect is configured so that the rotor body comprises a coupling portion configured to couple the at least one first end to the at least one second end to provide the annular shape of the rotor body.

In accordance with a seventeenth aspect of the present invention, the disc brake rotor according to the sixteenth aspect is configured so that the coupling portion includes at least one welded part at which the at least one first end is welded to the at least one second end.

In accordance with an eighteenth aspect of the present invention, the disc brake rotor according to the sixteenth aspect is configured so that the coupling portion includes at least one bonded part at which the at least one first end is bonded to the at least one second end by adhesive.

In accordance with a nineteenth aspect of the present invention, the disc brake rotor according to the sixteenth aspect is configured so that the coupling portion includes at least one coupling member configured to couple the at least one first end to the at least one second end.

In accordance with a twentieth aspect of the present invention, the disc brake rotor according to the fifteenth aspect is configured so that the main body has a multi-layered structure having different materials. The main body includes a first layer, a second layer, and a third layer. The first layer is made of a first material. The second layer is made of a second material. The third layer is made of a third material different from the first material and the second material and is provided between the first layer and the second layer.

In accordance with a twenty-first aspect of the present invention, the disc brake rotor according to the twentieth aspect is configured so that the first material comprises a first metallic material. The second material comprises a second metallic material. The third material comprises a third metallic material different from the first metallic material and the second metallic material.

In accordance with a twenty-second aspect of the present invention, the disc brake rotor according to the twentieth aspect is configured so that the first material comprises a first metallic material. The second material comprises a second metallic material. The third material comprises a resin material.

In accordance with a twenty-third aspect of the present invention, the disc brake rotor according to the sixteenth aspect is configured so that the coupling portion extends along a radial direction of the disc brake rotor and has a first length defined along the radial direction. The main body has a minimum radial width defined along the radial direction. The first length is longer than the minimum radial width.

In accordance with a twenty-fourth aspect of the present invention, the disc brake rotor according to the fifteenth aspect further comprises a hub attachment member configured to couple an inner peripheral part of the rotor body to a bicycle hub assembly.

In accordance with a twenty-fifth aspect of the present invention, the disc brake rotor according to the fifteenth aspect is configured so that the rotor body comprises a hub attachment portion configured to be attached to a bicycle hub assembly.

In accordance with a twenty-sixth aspect of the present invention, the disc brake rotor according to the fifteenth aspect is configured so that the rotor body includes at least one cutout provided on an outer peripheral part of the rotor body.

In accordance with a twenty-seventh aspect of the present invention, the disc brake rotor according to the fifteenth aspect is configured so that the rotor body comprises at least one cooling fin part disposed on an inner peripheral part of the main body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
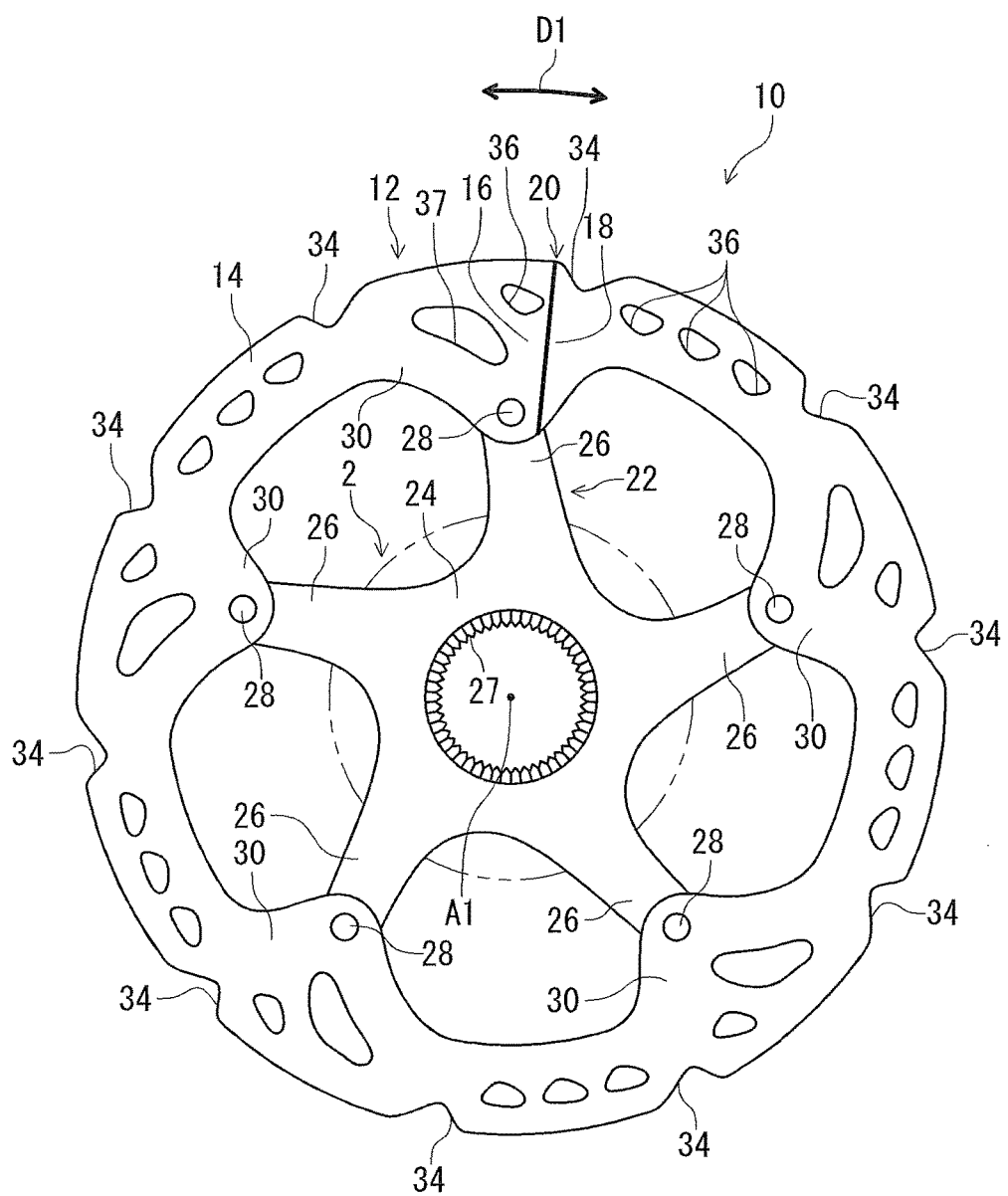
FIG. 1 is a side elevational view of a disc brake rotor in accordance with a first embodiment.

The embodiments will now be described with reference to the accompanying drawings, wherein like reference numerals designate corresponding or identical elements throughout the various drawings.

First Embodiment

Referring initially to FIG. 1, a disc brake rotor 10 in accordance with a first embodiment is configured to be mounted to a bicycle hub assembly 2. The disc brake rotor 10 is rotatable about a rotational axis A1. The disc brake rotor 10 comprises a rotor body 12 having an annular shape. The rotor body 12 comprises a main body 14 extending in a circumferential direction D1 of the disc brake rotor 10.

As seen in FIG. 1, the main body 14 includes at least one first end and at least one second end opposite to the at least one first end in the circumferential direction D1. In the illustrated embodiment, the main body 14 includes a first end 16 and a second end 18 opposite to the first end 16 in the circumferential direction D1. The main body 14 can, however, include a plurality of first ends and a plurality of second ends which are respectively opposite to the first ends in the circumferential direction D1 if needed and/or desired. In the present application, the annular shape can encompass a substantially annular shape having at least one slit in addition to a completely annular shape free from such a slit.

The rotor body 12 comprises a coupling portion 20 configured to couple the at least one first end to the at least one second end to provide the annular shape of the rotor body 12. In the illustrated embodiment, the rotor body 12 comprises the coupling portion 20 configured to couple the first end 16 to the second end 18 to provide the annular shape of the rotor body 12. The coupling portion 20 includes at least one welded part at which the at least one first end is welded to the at least one second end.

Figure 2:
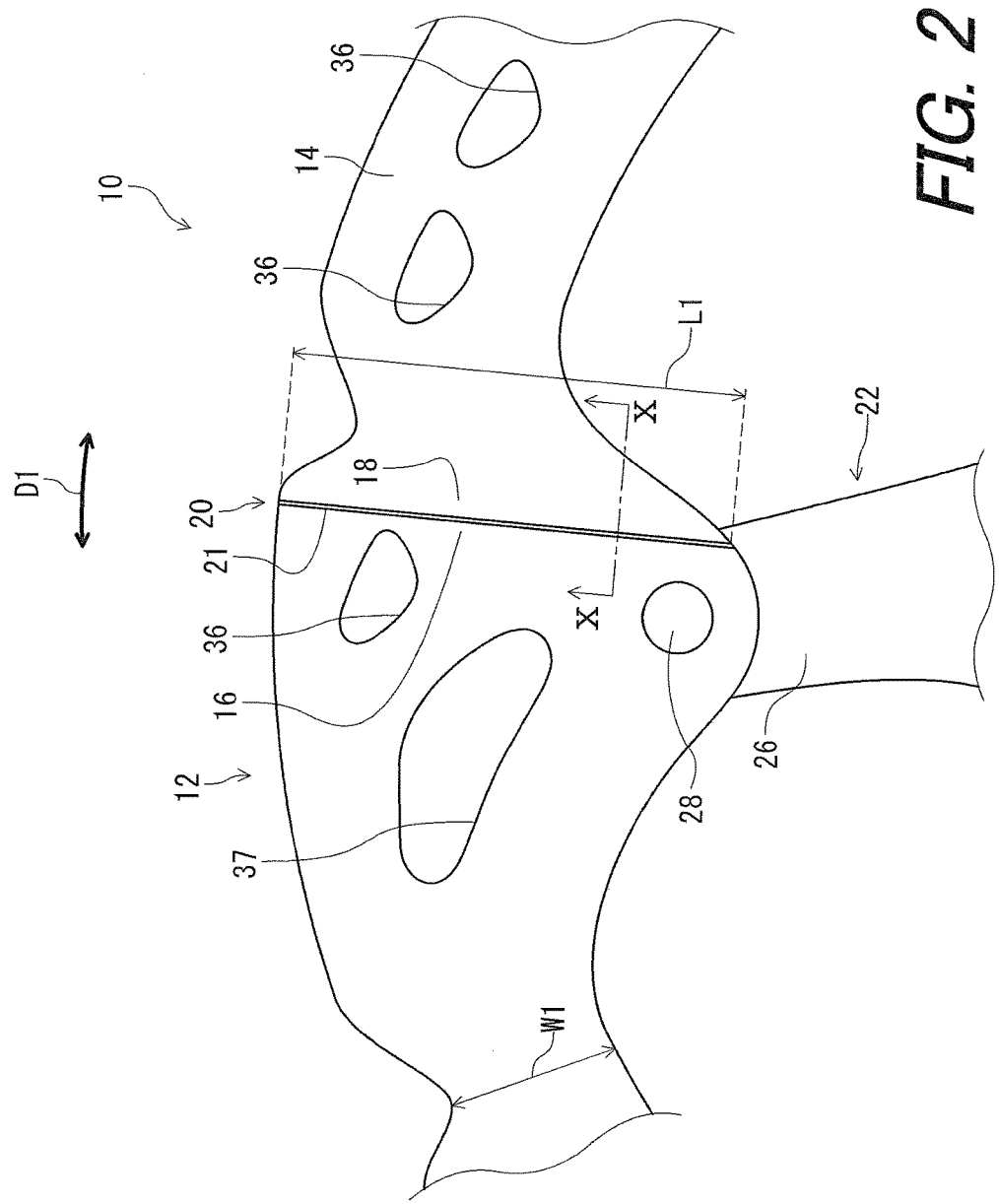
FIG. 2 is a partial enlarged view of the disc brake rotor illustrated in FIG. 1.

As seen in FIG. 2, the coupling portion 20 includes a welded part 21 at which the first end 16 is welded to the second end 18. In a case where the main body 14 includes a plurality of first ends and a plurality of second ends, the coupling portion 20 includes a plurality of welded parts at which the first ends are welded to the second ends respectively. The first end 16 can be coupled to the second end 18 using other coupling structures such as adhesive or a fastener (e.g., a rivet) if needed and/or desired.

The coupling portion 20 extends along a radial direction of the disc brake rotor 10. More specifically, the coupling portion 20 extends from an inner periphery of the main body 14 to an outer periphery of the main body 14. The coupling portion 20 has a first length L1 defined along the radial direction. The main body 14 has a minimum radial width W1 defined along the radial direction. The first length L1 is longer than the minimum radial width W1. The first length L1 can, however, be equal to the minimum radial width W1 if needed and/or desired. The radial direction of the disc brake rotor 10 can be defined as a direction perpendicular to the rotational axis A1 (FIG. 1).

As seen in FIG. 1, the disc brake rotor 10 further comprises a hub attachment member 22 configured to couple an inner peripheral part of the rotor body 12 to the bicycle hub assembly 2. In the illustrated embodiment, the hub attachment member 22 is a separate member from the rotor body 12. The hub attachment member 22 includes a hub engaging part 24 and attachment arms 26. The hub engaging part 24 has an annular shape. The hub engaging part 24 is configured to engage with the bicycle hub assembly 2. In the illustrated embodiment, the hub engaging part 24 includes an engaging hole 27. The attachment arms 26 extend radially outward from the hub engaging part 24. The attachment arms 26 are arranged in the circumferential direction D1 and spaced part from each other in the circumferential direction D1. The attachment arms 26 are configured to be attached to the inner peripheral part of the rotor body 12 using fasteners 28 such as rivets.

As seen in FIG. 1, the rotor body 12 comprises at least one connecting part configured to be connected to the hub attachment member 22. In the illustrated embodiment, the rotor body 12 comprises connecting parts 30 provided on an inner peripheral part of the main body 14. The connecting parts 30 are arranged in the circumferential direction D1. The connecting parts 30 are spaced part from each other in the circumferential direction D1. The connecting parts 30 protrude radially inward from the main body 14. The attachment arms 26 of the hub attachment member 22 are attached to the connecting parts 30 using the fasteners 28. The connecting parts 30 can, however, be connected to the attachment arms 26 using connecting structures such as welding or bonding. The number of the connecting parts 30 is not limited to the illustrated embodiment. For example, the rotor body 12 can include at least one connecting part 30 provided on an inner peripheral part of the main body 14 if needed and/or desired. Furthermore, the shape of the connecting parts 30 is not limited to the illustrated embodiment.

As seen in FIG. 1, the rotor body 12 includes at least one cutout provided on an outer peripheral part of the rotor body 12. In the illustrated embodiment, the rotor body 12 includes cutouts 34 provided on the outer peripheral part of the rotor body 12. The number of the cutouts 34 is not limited to the illustrated embodiment. For example, the rotor body 12 can include at least one cutout 34 provided on the outer peripheral part of the rotor body 12 if needed and/or desired. The cutouts 34 can be omitted from the rotor body 12 if needed and/or desired. Furthermore, the shape of the cutouts 34 is not limited to the illustrated embodiment.

The rotor body 12 comprises at least one through-hole. In the illustrated embodiment, the rotor body 12 comprises through-holes 36 and 37 provided on the main body 14. The through-holes 36 and 37 are arranged in the circumferential direction D1 and are spaced apart from each other in the circumferential direction D1. The number of the through-holes 36 is not limited to the illustrated embodiment. The rotor body 12 can include at least one through-hole 36 provided on the main body 14 if needed and/or desired. The number of the through-holes 37 is not limited to the illustrated embodiment. The rotor body 12 can include at least one through-hole 37 provided on the main body 14 if needed and/or desired. At least one of the through-holes 36 and 37 can be omitted from the rotor body 12 if needed and/or desired. In the illustrated embodiment, the through-holes 37 have an area greater than an area of the through-holes 36. However, the shapes of the through-holes 36 and 37 are not limited to the illustrated embodiment.

A method of manufacturing the disc brake rotor 10 will be described below referring to FIGS. 1 to 11.

Figure 3:
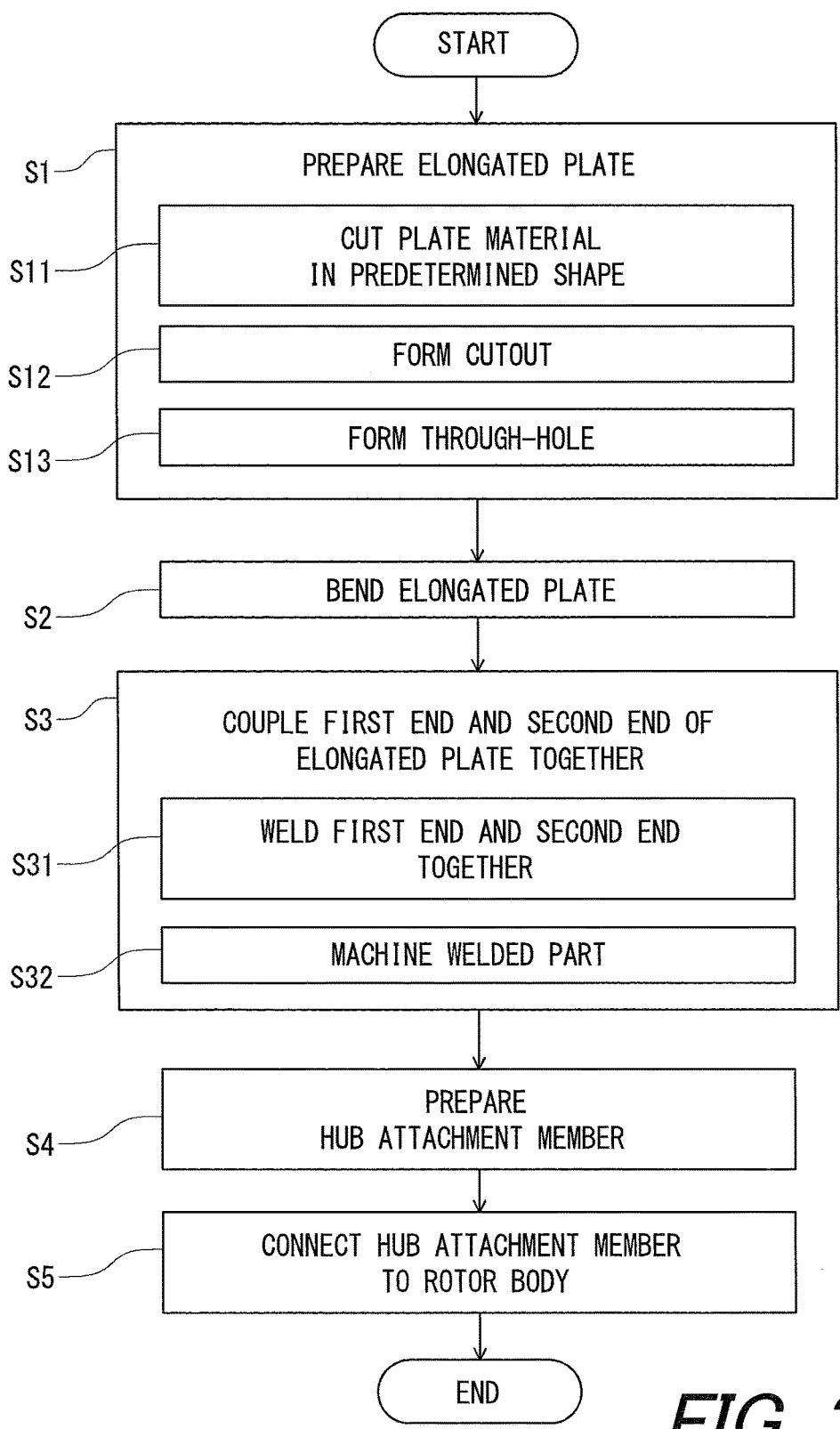
FIG. 3 is a flow chart showing a method of manufacturing the disc brake rotor illustrated in FIG. 1.
Figure 4:
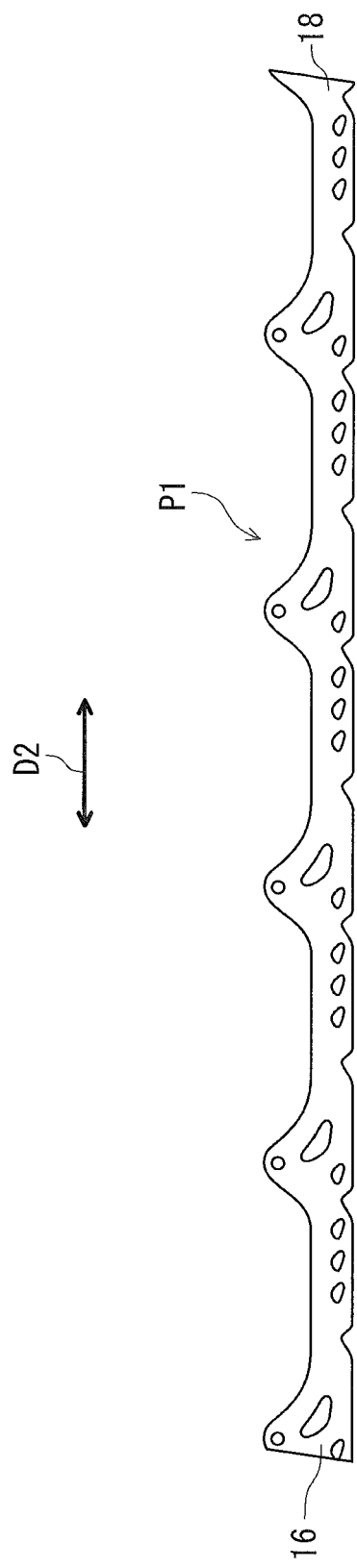
FIG. 4 is a plan view of an elongated plate for explaining the method of manufacturing the disc brake rotor illustrated in FIG. 1.

As seen in FIG. 3, the method of manufacturing the disc brake rotor 10 comprises preparing at least one elongated plate (step S1). The at least one elongated plate has a first end and a second end opposite to the first end in a longitudinal direction of the at least one elongated plate. In the illustrated embodiment, as seen in FIG. 4, an elongated plate P1 is prepared. The elongated plate P1 has the first end 16 and the second end 18 opposite to the first end 16 in a longitudinal direction D2 of the elongated plate P1.

Figure 5:
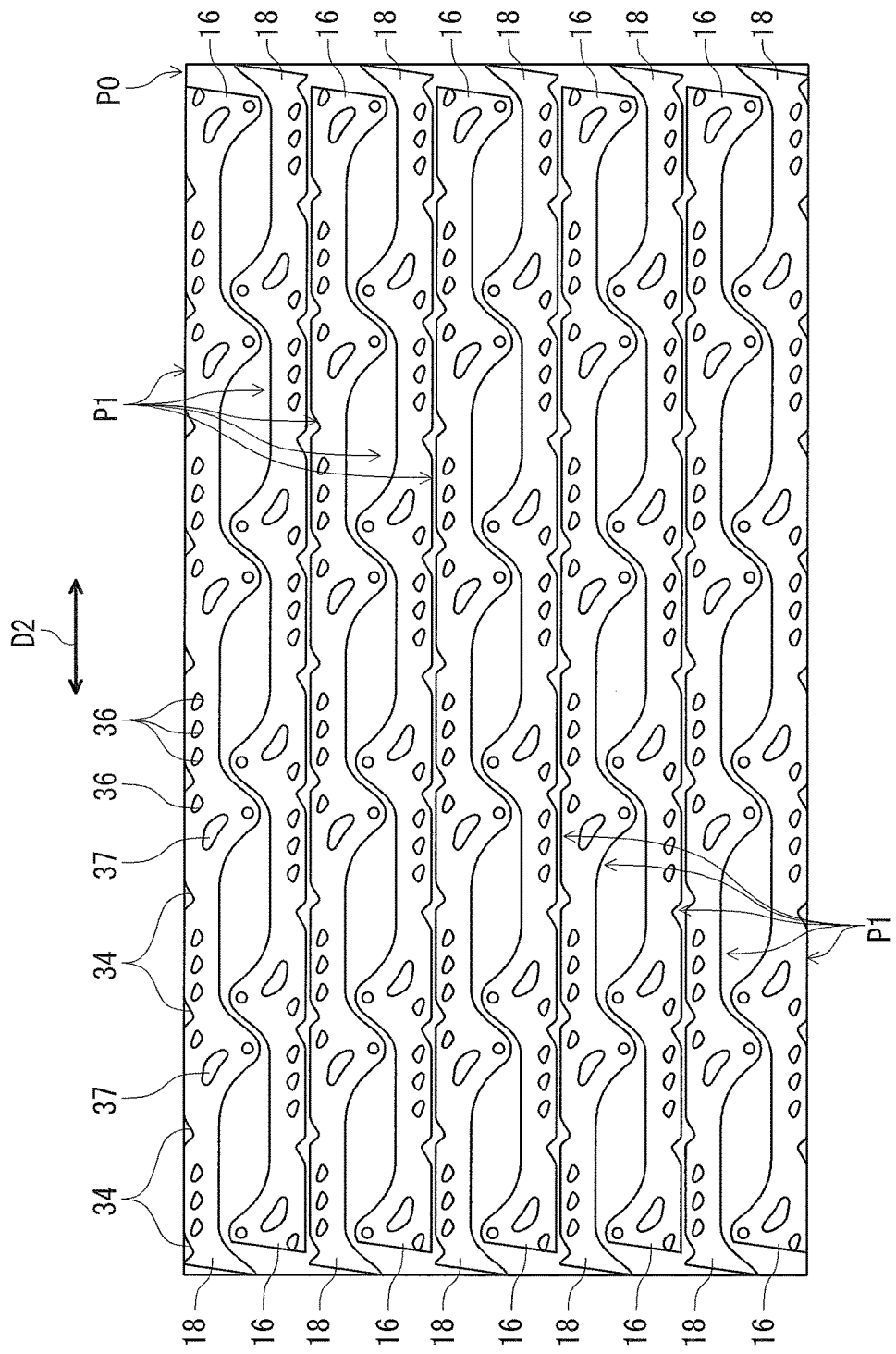
FIG. 5 is a plan view of a plate material for explaining the method of manufacturing the disc brake rotor illustrated in FIG. 1.

As seen in FIG. 3, the preparing of the at least one elongated plate includes cutting a plate material in a predetermined shape to provide the at least one elongated plate (step S11). In the illustrated embodiment, as seen in FIG. 5, a plate material P0 is cut in a predetermined shape to provide the elongated plates P1 by punching.

As seen in FIG. 3, the preparing of the at least one elongated plate includes forming at least one cutout on the at least one elongated plate (step S12). In the illustrated embodiment, as seen in FIG. 5, the cutouts 34 are formed on the elongated plate P1 by punching when the plate material P0 is cut in the predetermined shape to provide the elongated plates P1. The cutouts 34 can, however, be formed on the elongated plate P1 after the plate material P0 is cut in the predetermined shape to provide the elongated plates P1.

As seen in FIG. 3, the preparing of the at least one elongated plate includes forming at least one through-hole on the at least one elongated plate (step S13). In the illustrated embodiment, as seen in FIG. 5, the through-holes 36 and 37 are formed on the elongated plate P1 by punching when the plate material P0 is cut in the predetermined shape to provide the elongated plates P1. The through-holes 36 and 37 can, however, be formed on the elongated plate P1 before or after the plate material P0 is cut in the predetermined shape to provide the elongated plates P1 if needed and/or desired.

Figure 6:
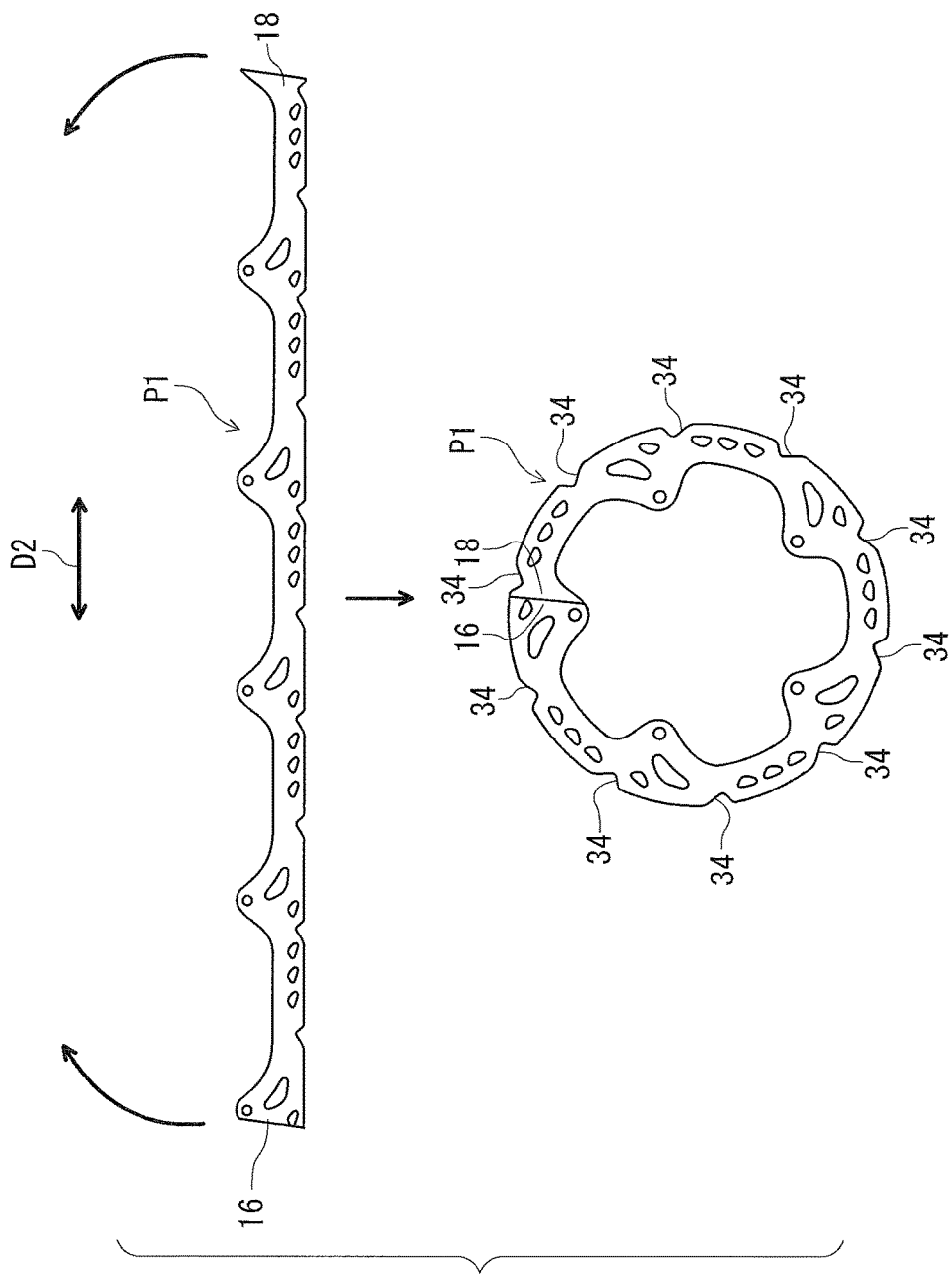
FIG. 6 is a plan view of the elongated plate for explaining the method of manufacturing the disc brake rotor illustrated in FIG. 1.

As seen in FIG. 3, the method comprises bending the at least one elongated plate in an arc shape (step S2). In the illustrated embodiment, as seen in FIG. 6, the elongated plate P1 is bent in an annular shape. Namely, the arc shape can encompass the annular shape.

Figure 7:
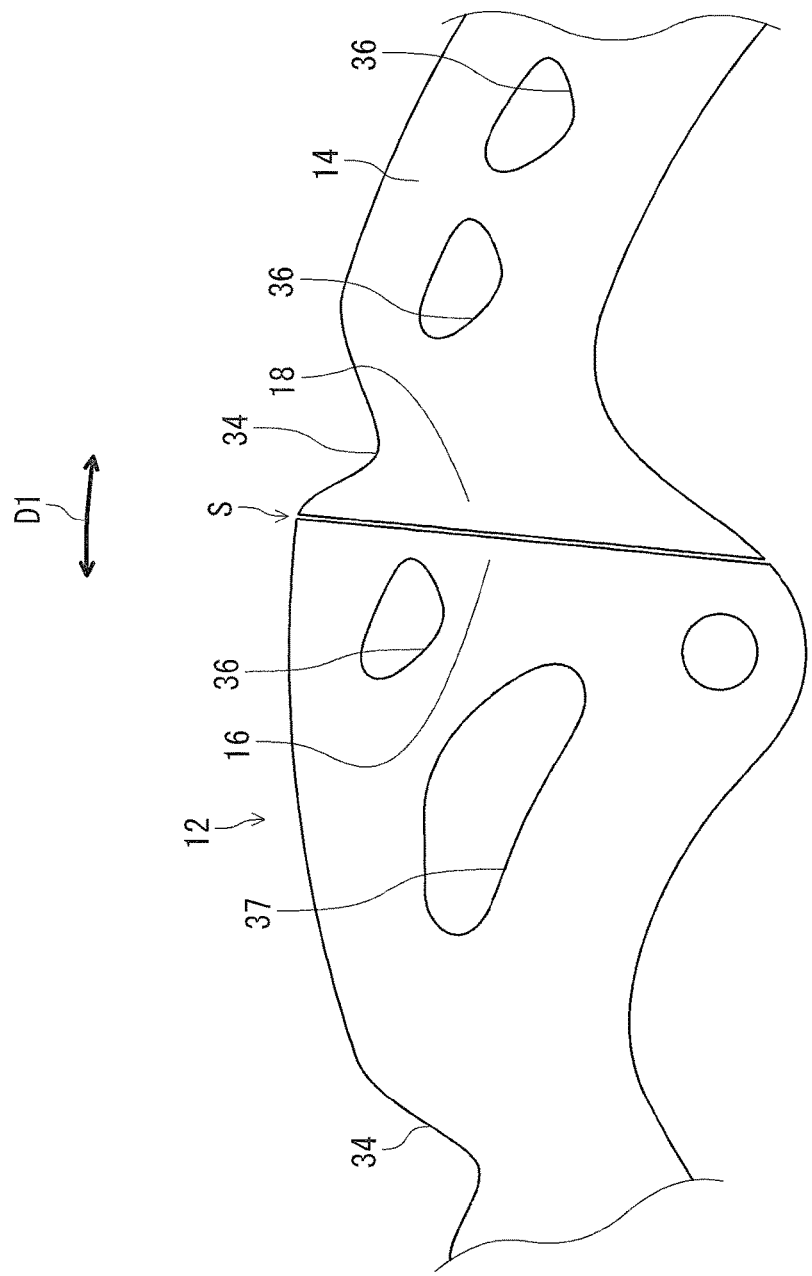
FIG. 7 is a partial enlarged view of the elongated plate for explaining the method of manufacturing the disc brake rotor illustrated in FIG. 1.

As seen in FIGS. 6 and 7, the bending of the at least one elongated plate includes bending the at least one elongated plate so that the first end 16 comes close to the second end 18. In the illustrated embodiment, the elongated plate P1 is bent so that the first end 16 comes close to the second end 18. More specifically, as seen in FIG. 7, the elongated plate P1 is bent so that the first end 16 faces the second end 18 to provide a slit S between the first end 16 and the second end 18. The elongated plate P1 can, however, be bent so that the first end 16 contacts the second end 18 if needed and/or desired. The elongated plate P1 can be bent so that the first end 16 at least partially overlaps with the second end 18 if needed and/or desired.

As seen in FIG. 6, the bending of the at least one elongated plate includes bending the at least one elongated plate so that the at least one cutout is disposed on an outer peripheral part of the rotor body 12. In the illustrated embodiment, the elongated plate P1 is bent so that the cutouts 34 are disposed on the outer peripheral part of the rotor body 12.

Figure 8:
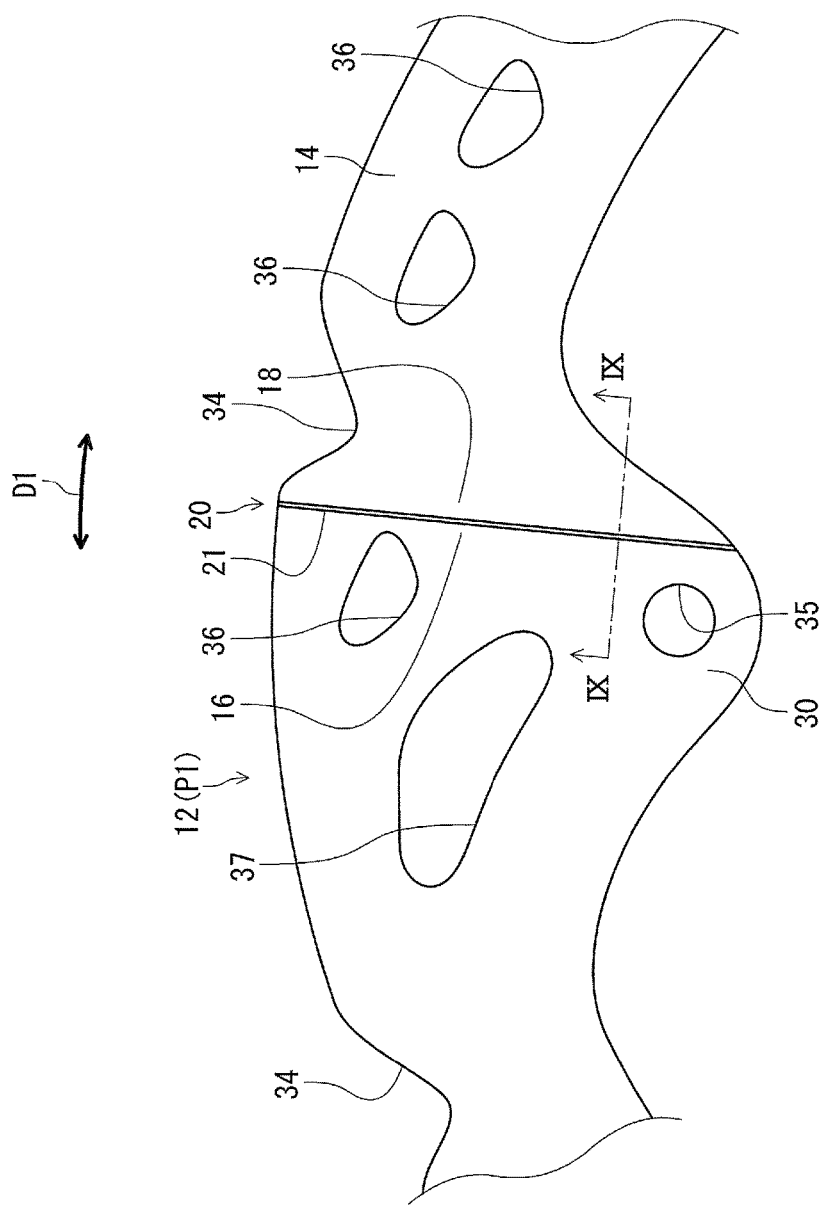
FIG. 8 is a partial enlarged view of the elongated plate for explaining the method of manufacturing the disc brake rotor illustrated in FIG. 1.

As seen in FIG. 3, the method further comprises coupling the first end 16 and the second end 18 of the at least one elongated plate together to provide the rotor body 12 having the annular shape (step S3). In the illustrated embodiment, as seen in FIGS. 2 and 8, the first end 16 and the second end 18 of the elongated plate P1 are coupled together to provide the rotor body 12 having the annular shape.

Figure 9:
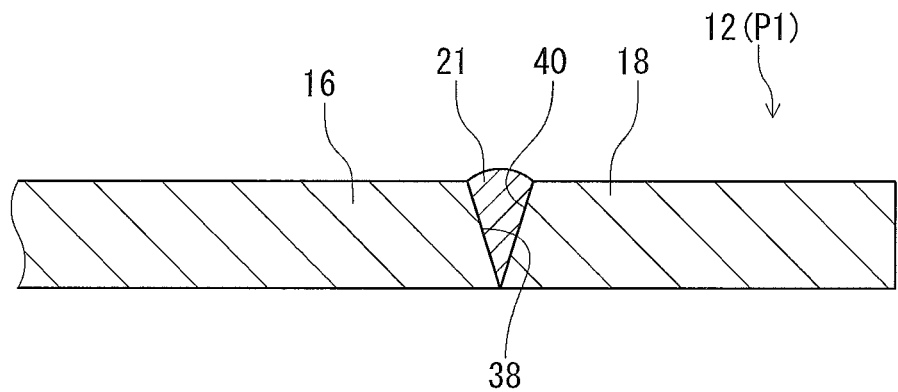
FIG. 9 is a cross-sectional view of the elongated plate taken along line IX-IX of FIG. 8.

As seen in FIG. 3, the coupling of the first end 16 and the second end 18 includes welding the first end 16 and the second end 18 together (step S31). In the illustrated embodiment, as seen in FIGS. 8 and 9, the first end 16 and the second end 18 are welded together by butt welding. The first end 16 and the second end 18 are welded together at the welded part 21. In the illustrated embodiment, as seen in FIG. 8, the coupling of the first end 16 and the second end 18 provides one of the connecting parts 30. Each of the connecting parts 30 includes a connecting hole 35 through which the fastener 28 (FIG. 2) extends.

As seen in FIG. 9, for example, the first end 16 can include a first inclined end surface 38, and the second end 18 can include a second inclined end surface 40. However, at least one of the first inclined end surface 38 and the second inclined end surface 40 can be omitted from the elongated plate P1 if needed and/or desired.

Figure 10:
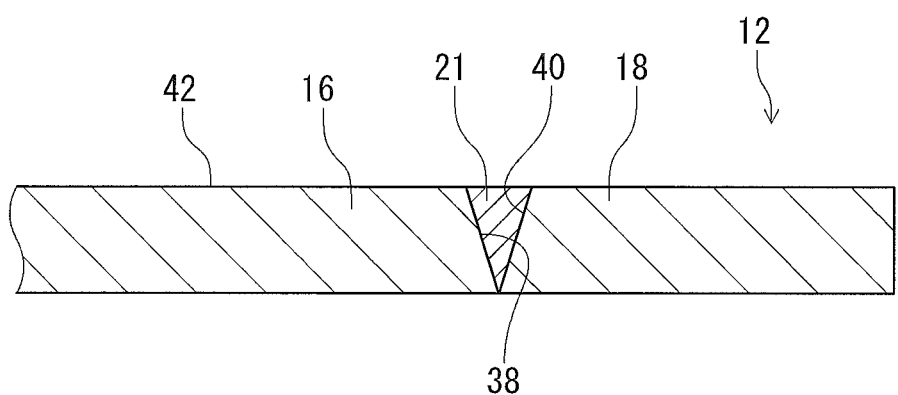
FIG. 10 is a cross-sectional view of the disc brake rotor taken along line X-X of FIG. 2.

As seen in FIG. 3, the method further comprises machining the welded part 21 at which the first end 16 and the second end 18 are welded together in the coupling of the first end 16 and the second end 18 (step S32). More specifically, as seen in FIG. 10, a weld bead of the welded part 21 is machined so that a friction surface 42 is flat. Thus, the rotor body 12 is prepared. The machining of the welded part 21 can be omitted from the method of manufacturing the disc brake rotor 10 if needed and/or desired.

Figure 11:
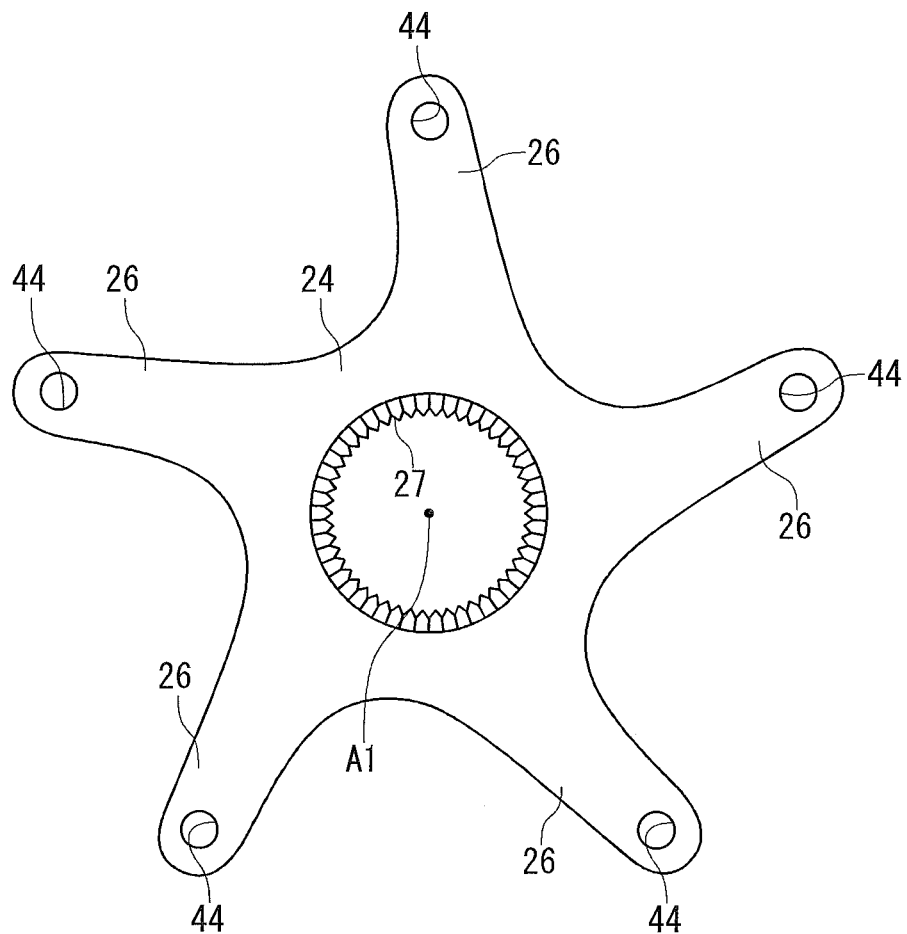
FIG. 11 is a plan view of a hub attachment member of the disc brake rotor illustrated in FIG. 1.

As seen in FIGS. 3 and 11, the method further comprises preparing the hub attachment member 22 configured to couple the inner peripheral part of the rotor body 12 to the bicycle hub assembly 2 (step S4). For example, the hub attachment member 22 is made of a metallic material. As seen in FIG. 11, each of the attachment arms 26 of the hub attachment member 22 includes a fastening hole 44 through which the fastener 28 (FIG. 2) extends.

As seen in FIGS. 1 and 3, the method further comprises connecting the hub attachment member 22 to the rotor body 12 using the fasteners 28 such as rivets (step S5). Thus, the disc brake rotor 10 illustrated in FIG. 1 can be manufactured using the method shown in FIG. 3.

With the method of manufacturing the disc brake rotor 10, the elongated plate P1 having the first end 16 and the second end 18 is prepared, and the elongated plate P1 is bent in the arc shape. The elongated plates P1 can be more efficiently disposed in the plate material P0 than comparative rotor bodies having an annular shape. Accordingly, it is possible to improve yield rate of the disc brake rotor 10.

With the disc brake rotor 10, since the main body 14 includes at least one first end 16 and at least one second end 18 opposite to the at least one first end 16 in the circumferential direction D1, the main body 14 can be formed by at least one elongated plate P1. The elongated plates P1 can be more efficiently disposed in the plate material P0 than comparative rotor bodies having an annular shape. Accordingly, it is possible to improve yield rate of the disc brake rotor 10.

Second Embodiment

A disc brake rotor 210 in accordance with a second embodiment will be described below referring to FIGS. 12 to 19. The disc brake rotor 210 has the same configuration as the disc brake rotor 10 except for the rotor body 12 and the hub attachment member 22. Thus, elements having substantially the same function as those in the first embodiment will be numbered the same here, and will not be described again in detail here for the sake of brevity.

Figure 12:
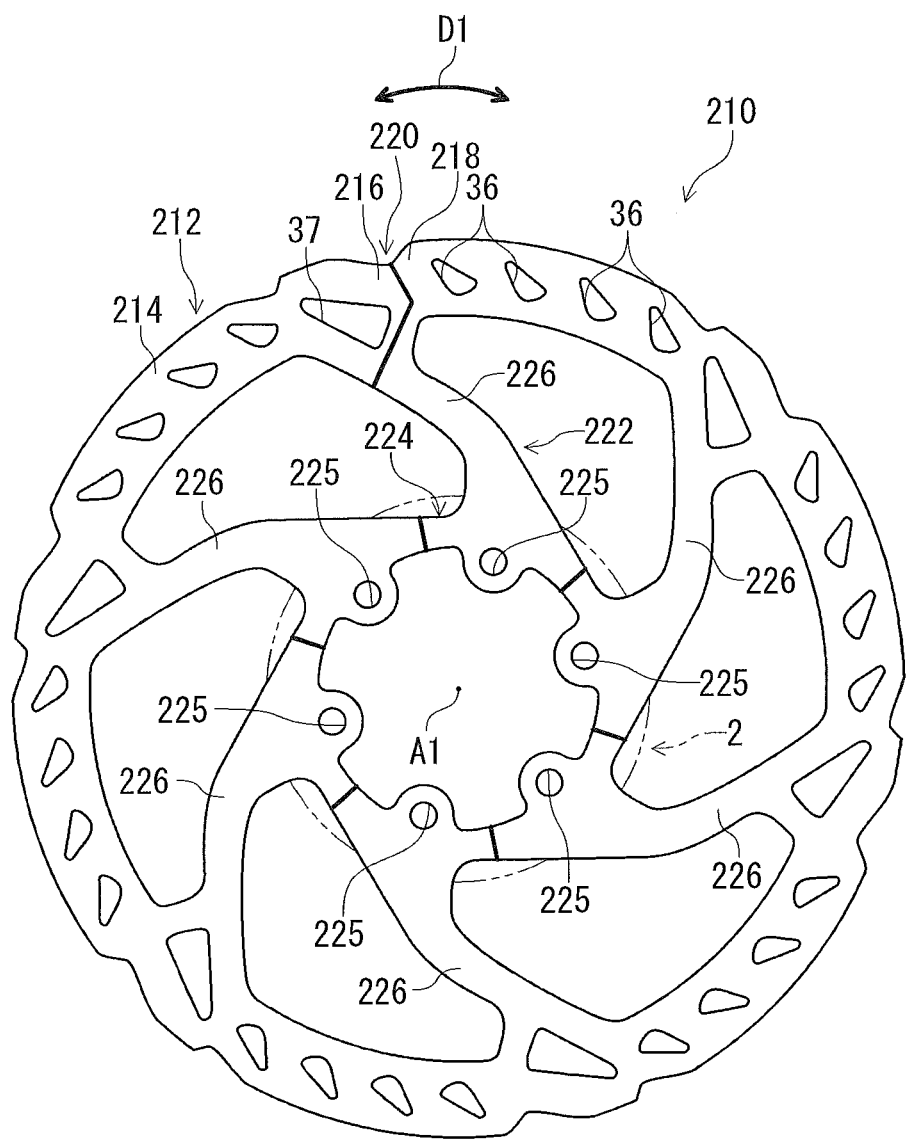
FIG. 12 is a side elevational view of a disc brake rotor in accordance with a second embodiment.

As seen in FIG. 12, the disc brake rotor 210 comprises a rotor body 212 having an annular shape. The rotor body 212 comprises a main body 214 extending in the circumferential direction D1 of the disc brake rotor 210. The main body 214 includes at least one first end and at least one second end opposite to the at least one first end in the circumferential direction D1. In the illustrated embodiment, the main body 214 includes a first end 216 and a second end 218 opposite to the first end 216 in the circumferential direction D1. The main body 214 can, however, include a plurality of first ends and a plurality of second ends which are respectively opposite to the first ends in the circumferential direction D1 if needed and/or desired.

The rotor body 212 comprises a hub attachment portion 222 configured to be attached to the bicycle hub assembly 2. Unlike the hub attachment member 22 in accordance with the first embodiment, the hub attachment portion 222 is provided integrally with the main body 214 of the rotor body 212.

The rotor body 212 comprises a coupling portion 220 configured to couple the at least one first end to the at least one second end to provide the annular shape of the rotor body 212. The coupling portion 220 includes at least one welded part at which the at least one first end is welded to the at least one second end. In the illustrated embodiment, the rotor body 212 comprises a coupling portion 220 configured to couple the first end 216 to the second end 218 to provide the annular shape of the rotor body 212.

Figure 13:
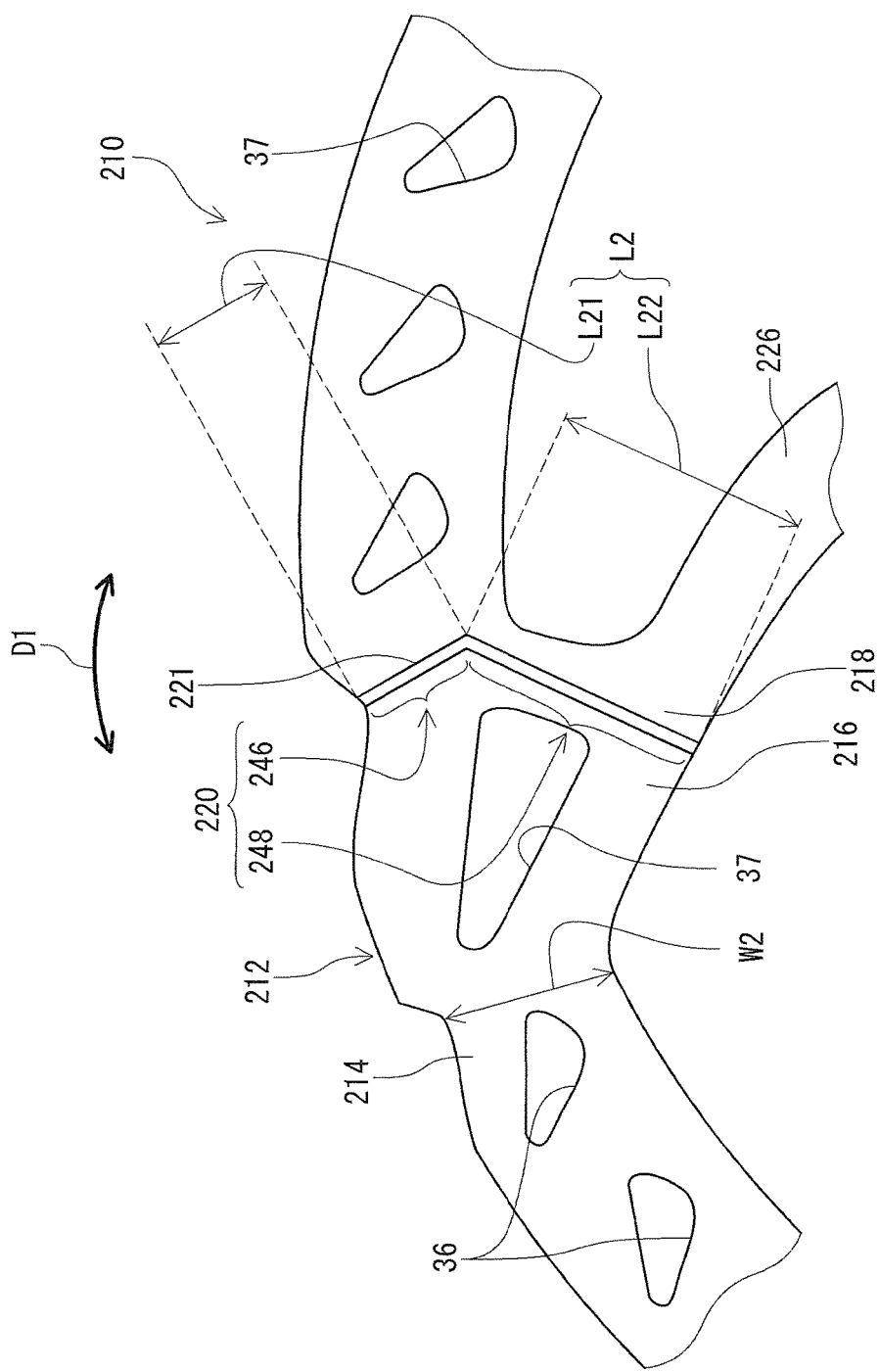
FIG. 13 is a partial enlarged view of the disc brake rotor illustrated in FIG. 12.

As seen in FIG. 13, the coupling portion 220 includes a welded part 221 at which the first end 216 is welded to the second end 218. In a case where the main body 214 includes a plurality of first ends and a plurality of second ends, the coupling portion 220 includes a plurality of welded parts at which the first ends are welded to the second ends respectively. The first end 216 can be coupled to the second end 218 using other coupling structures such as adhesive or a fastener (e.g., a rivet) if needed and/or desired.

The coupling portion 220 extends along a radial direction of the disc brake rotor 210. More specifically, the coupling portion 220 extends from an inner periphery of the main body 214 to an outer periphery of the main body 214. In the illustrated embodiment, the coupling portion 220 is partially provided on the hub attachment portion 222.

As seen in FIG. 13, the coupling portion 220 has a first length L2 defined along the radial direction. In the illustrated embodiment, the first length L2 is defined along the coupling portion 220. The coupling portion 220 includes a first part 246 and a second part 248. The first part 246 extends in a direction different from a direction in which the second part 248 extends. The first part 246 has a length L21 defined along the radial direction of the disc brake rotor 210. The second part 248 has a length L22 defined along the radial direction of the disc brake rotor 210. The first length L2 is a sum of the lengths L21 and L22. The main body 214 has a minimum radial width W2 defined along the radial direction. The first length L2 is longer than the minimum radial width W2. The first length L2 can, however, be equal to the minimum radial width W2 if needed and/or desired.

As seen in FIG. 12, the hub attachment portion 222 includes a hub engaging part 224 and attachment arms 226. The hub engaging part 224 has an annular shape. The hub engaging part 224 is configured to engage with the bicycle hub assembly 2. In the illustrated embodiment, the hub engaging part 224 includes mounting holes 225. The hub engaging part 224 is configured to be attached to the bicycle hub assembly 2 using the mounting holes 225 and bolts (not shown). The attachment arms 226 extend radially outward from the hub engaging part 224. The attachment arms 226 are arranged in the circumferential direction D1 and are spaced part from each other in the circumferential direction D1. The attachment arms 226 are integrally coupled to the inner peripheral part of the main body 214.

Figure 14:
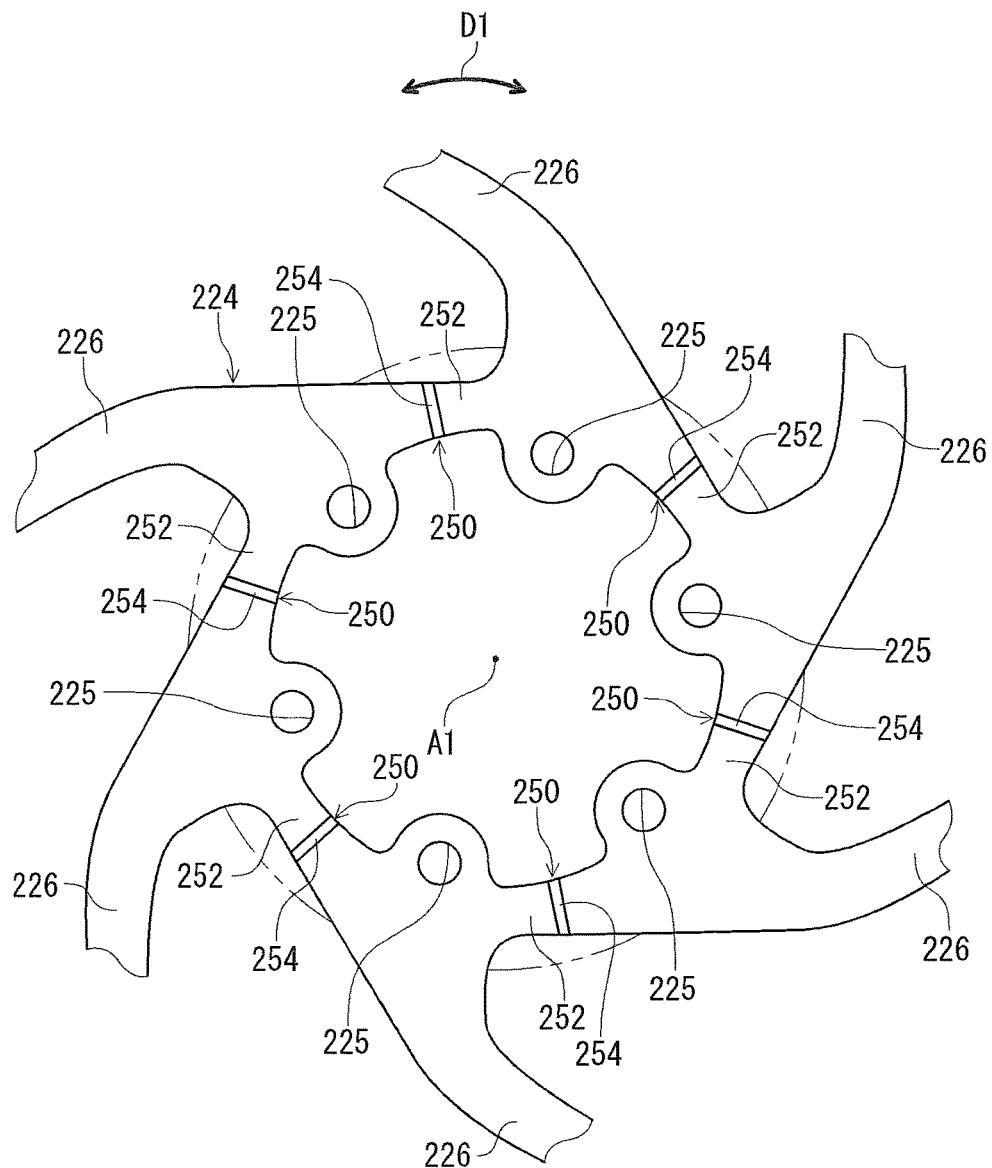
FIG. 14 is a partial enlarged view of the disc brake rotor illustrated in FIG. 12.

As seen in FIG. 14, the hub attachment portion 222 includes coupling parts 250. The coupling parts 250 are provided on the hub engaging part 224. More specifically, the hub engaging part 224 includes divided elements 252 arranged in the circumferential direction D1. The divided elements 252 are coupled to each other via the coupling parts 250. Each of the coupling parts 250 includes a welded section 254 at which adjacent two of the divided elements 252 are welded together. The number of the divided elements 252 is not limited to the illustrated embodiment. The divided elements 252 can be separate from each other without the coupling parts 250.

A method of manufacturing the disc brake rotor 210 will be described below referring to FIGS. 15 to 19.

Figure 15:
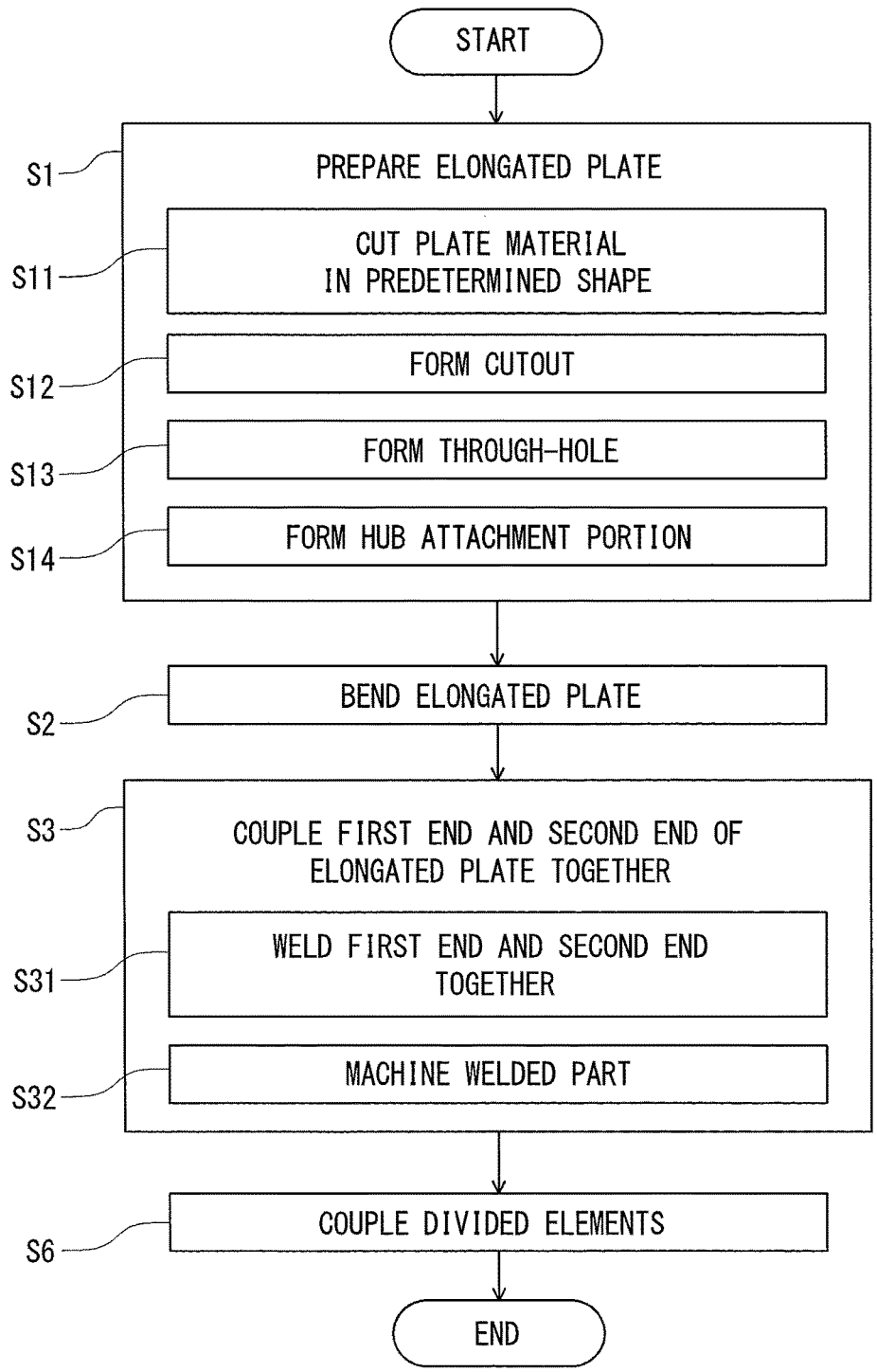
FIG. 15 is a flow chart showing a method of manufacturing the disc brake rotor illustrated in FIG. 12.
Figure 16:
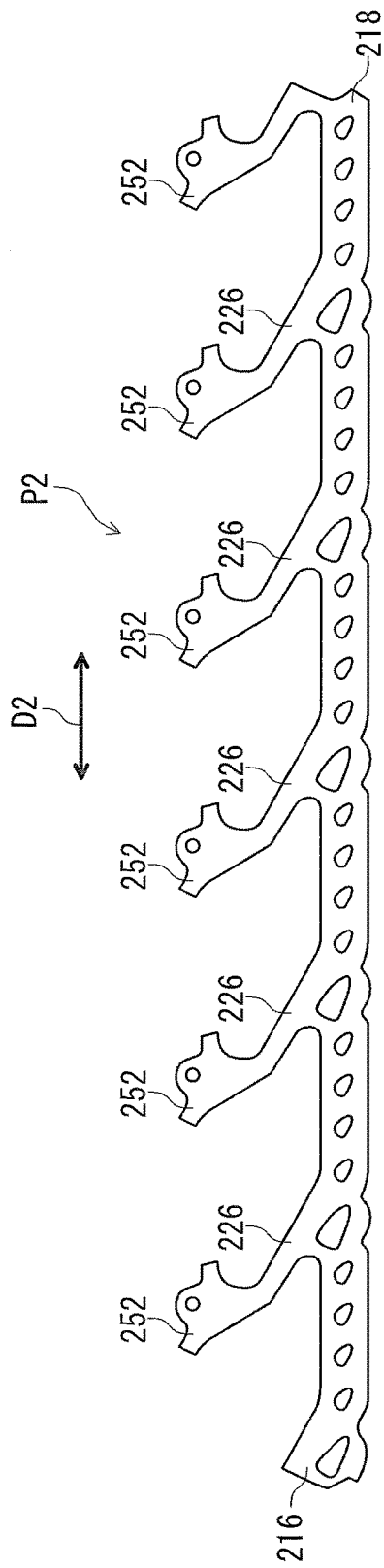
FIG. 16 is a plan view of an elongated plate for explaining the method of manufacturing the disc brake rotor illustrated in FIG. 12.

As seen in FIG. 15, the method of manufacturing the disc brake rotor 210 comprises preparing at least one elongated plate (step S1). The at least one elongated plate has a first end and a second end opposite to the first end in a longitudinal direction of the at least one elongated plate. In the illustrated embodiment, as seen in FIG. 16, an elongated plate P2 is prepared. The elongated plate P2 has the first end 216 and the second end 218 opposite to the first end 216 in the longitudinal direction D2 of the elongated plate P2.

Figure 17:
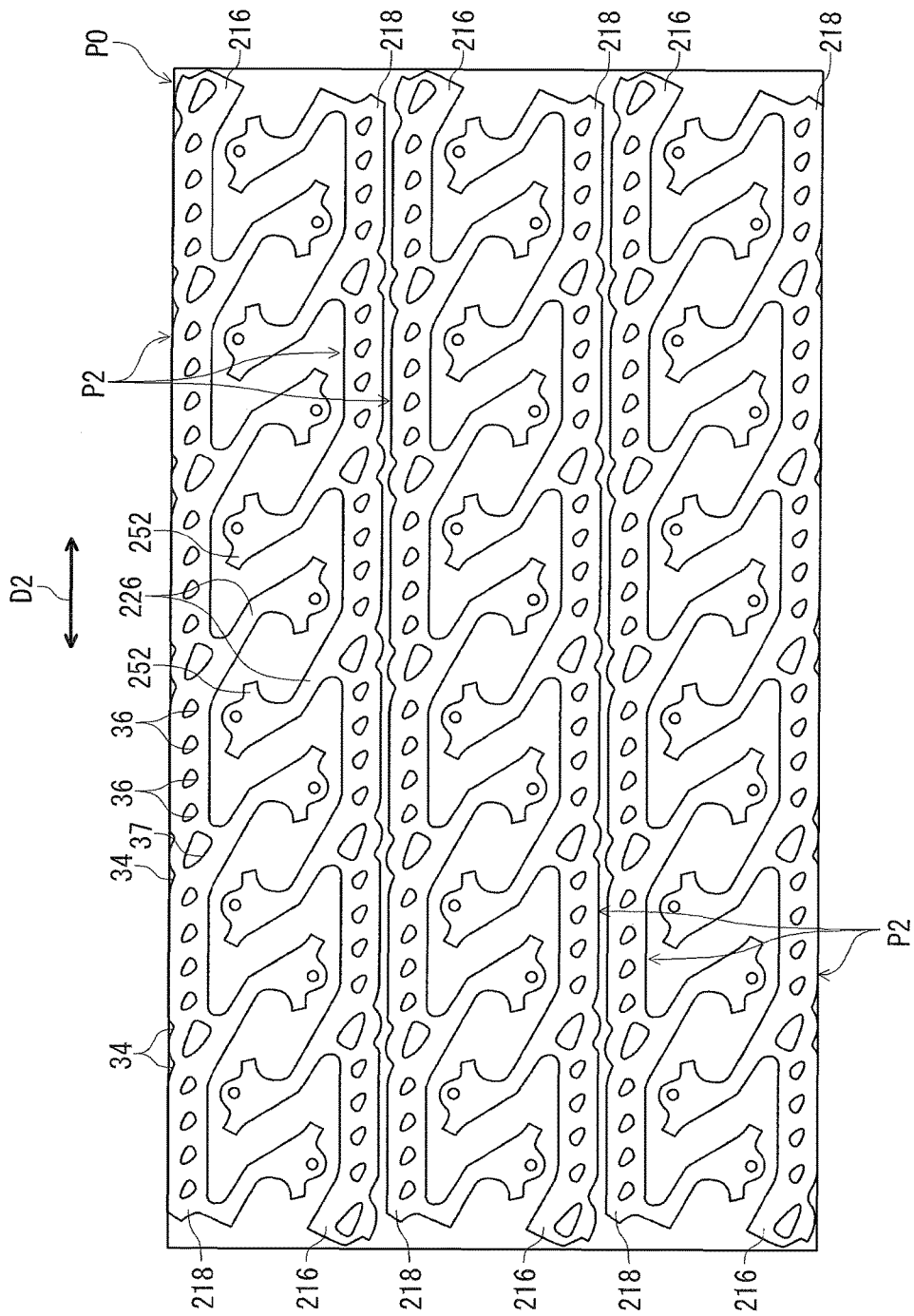
FIG. 17 is a plan view of a plate material for explaining the method of manufacturing the disc brake rotor illustrated in FIG. 12.

As seen in FIG. 15, the preparing of the at least one elongated plate includes cutting a plate material in a predetermined shape to provide the at least one elongated plate (step S11). In the illustrated embodiment, as seen in FIG. 17, the plate material P0 is cut in a predetermined shape to provide the elongated plates P2 by punching.

As seen in FIG. 15, the preparing of the at least one elongated plate includes forming at least one cutout on the at least one elongated plate (step S12). In the illustrated embodiment, as seen in FIG. 17, the cutouts 34 are formed on the elongated plate P2 by punching when the plate material P0 is cut in the predetermined shape to provide the elongated plates P2. The cutouts 34 can, however, be formed on the elongated plate P2 after the plate material P0 is cut in the predetermined shape to provide the elongated plates P2.

As seen in FIG. 15, the preparing of the at least one elongated plate includes forming a through-hole on the at least one elongated plate before the bending of the at least one elongated plate (step S13). In the illustrated embodiment, as seen in FIG. 17, the through-holes 36 and 37 are formed on the elongated plate P2 by punching when the plate material P0 is cut in the predetermined shape to provide the elongated plates P2. The through-holes 36 and 37 can, however, be formed on the elongated plate P2 before or after the plate material P0 is cut in the predetermined shape to provide the elongated plates P2.

As seen in FIG. 15, the preparing of the at least one elongated plate includes forming the hub attachment portion 222 configured to be attached to a bicycle hub assembly 2 (step S14). In the illustrated embodiment, as seen in FIG. 17, the attachment arms 226 and the divided elements 252 are formed by punching when the plate material P0 is cut in the predetermined shape to provide the elongated plates P2. More specifically, the attachment arms 226 and the divided elements 252 are formed by punching when the plate material P0 is cut in the predetermined shape to provide the elongated plates P2. The attachment arms 226 and the divided elements 252 can, however, be formed on the elongated plate P2 after the plate material P0 is cut in the predetermined shape to provide the elongated plates P2.

Figure 18:
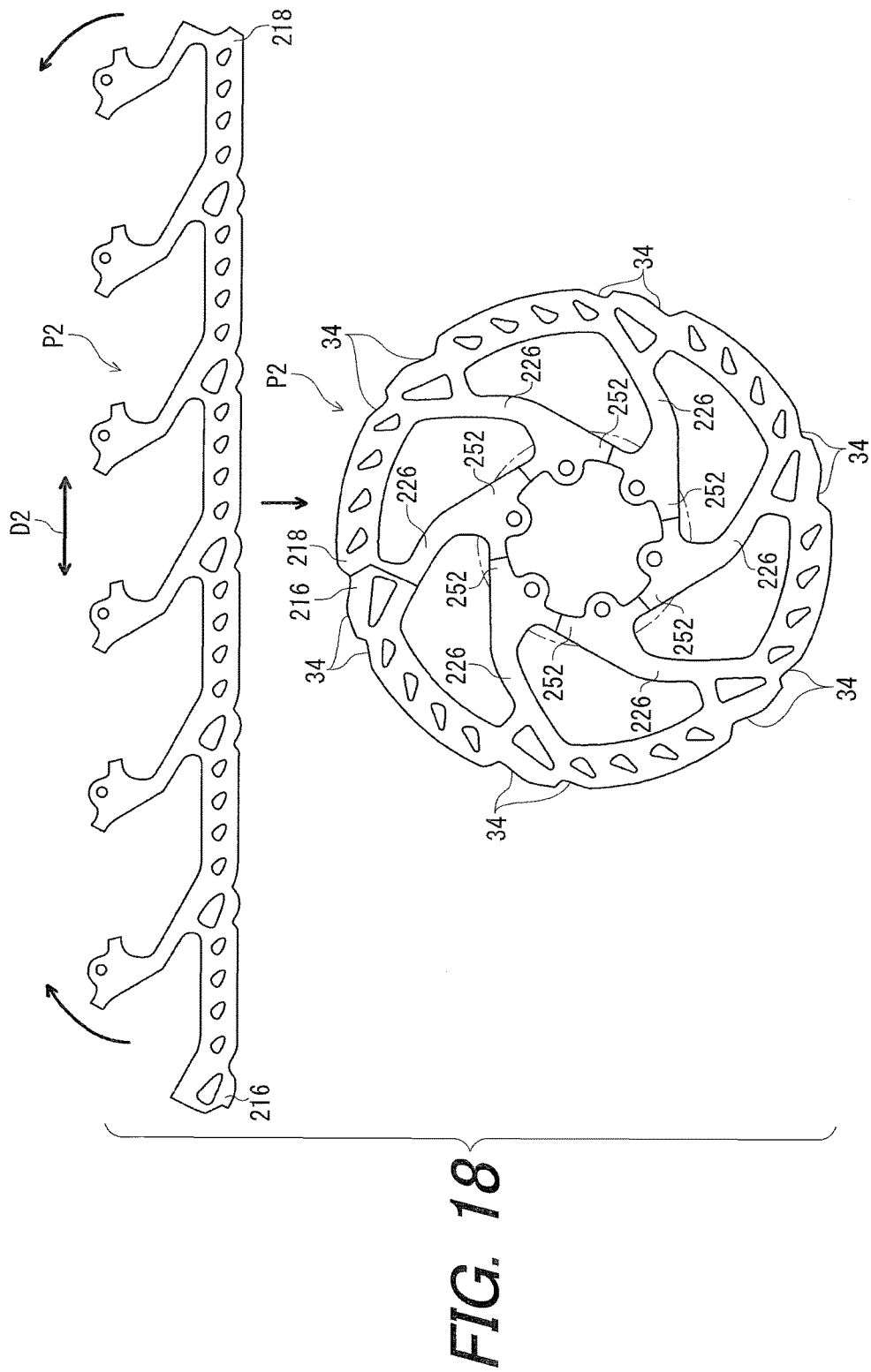
FIG. 18 is a plan view of the elongated plate for explaining the method of manufacturing the disc brake rotor illustrated in FIG. 12.

As seen in FIG. 15, the method comprises bending the at least one elongated plate in an arc shape (step S2). In the illustrated embodiment, as seen in FIG. 18, the elongated plate P2 is bent in an annular shape. Namely, the arc shape can encompass the annular shape.

As seen in FIG. 18, the bending of the at least one elongated plate includes bending the at least one elongated plate so that the hub attachment portion is disposed on an inner peripheral part of the at least one elongated plate. In the illustrated embodiment, the elongated plate P2 is bent so that the hub attachment portion 222 is disposed on an inner peripheral part of the elongated plate P2.

As seen in FIG. 18, the bending of the at least one elongated plate includes bending the at least one elongated plate so that the first end 216 comes close to the second end 218. In the illustrated embodiment, as seen in FIG. 18, the elongated plate P2 is bent so that the first end 216 comes close to the second end 218. More specifically, the elongated plate P2 is bent so that the first end 216 faces the second end 218 to provide a slit between the first end 216 and the second end 218. The elongated plate P2 can, however, be bent so that the first end 216 contacts the second end 218 if needed and/or desired. The elongated plate P2 can be bent so that the first end 216 at least partially overlaps with the second end 218 if needed and/or desired.

As seen in FIG. 18, the bending of the at least one elongated plate includes bending the at least one elongated plate so that the at least one cutout is disposed on an outer peripheral part of the rotor body 212. In the illustrated embodiment, the elongated plate P2 is bent so that the cutouts 34 are disposed on the outer peripheral part of the rotor body 212.

As seen in FIG. 15, the method further comprises coupling the first end 216 and the second end 218 of the at least one elongated plate together to form the rotor body 212 having the annular shape (step S3). In the illustrated embodiment, as seen in FIGS. 12 and 13, the first end 216 and the second end 218 of the elongated plate P2 are coupled together to form the rotor body 212 having the annular shape.

As seen in FIG. 15, the coupling of the first end 216 and the second end 218 includes welding the first end 216 and the second end 218 together (step S31). In the illustrated embodiment, as seen in FIG. 13, the first end 216 and the second end 218 are welded together by butt welding. The first end 216, the second end 218, and the coupling portion 220 have substantially the same structures as the first end 16, the second end 18, and the coupling portion 20 in accordance with the first embodiment. Accordingly, structures of the first end 216, the second end 218, and the coupling portion 220 will not be described in detail here for the sake of brevity.

As seen in FIGS. 14, 15 and 18, the method further comprises coupling the divided elements 252 together to provide the hub engaging part 224 (step S6). In the illustrated embodiment, as seen in FIG. 14, adjacent two of the divided elements 252 are welded together at the welded section 254. The coupling of the divided elements 252 can be omitted from the method of manufacturing the disc brake rotor 210 if needed and/or desired.

With the method of manufacturing the disc brake rotor 210, it is possible to obtain the same advantageous effect of the method in accordance with the first embodiment.

With the disc brake rotor 210, it is possible to obtain the same advantageous effect of the disc brake rotor 10 in accordance with the first embodiment.

Figure 19:
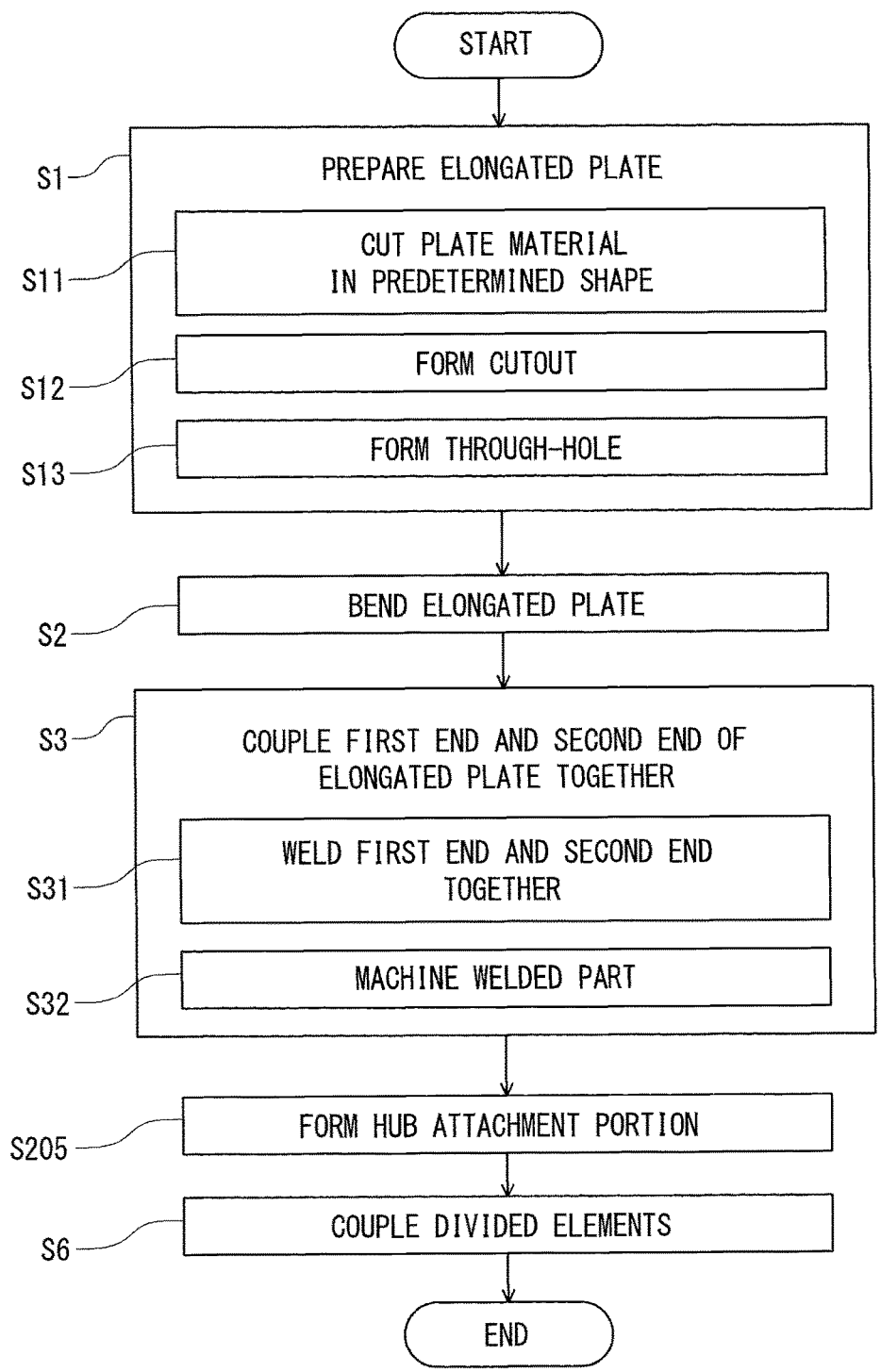
FIG. 19 is a flow chart showing another method of manufacturing the disc brake rotor illustrated in FIG. 12.

In the method in accordance with the second embodiment, the hub attachment portion 222 is formed before the elongated plate P2 is bent in the arc shape. As seen in FIG. 19, however, the method further can comprise forming, on an inner peripheral part of the at least one elongated plate, a hub attachment portion configured to be attached to the bicycle hub assembly after the at least one elongated plate is bent in the arc shape (step S205). In the illustrated embodiment, the hub attachment portion 222 are formed on the inner peripheral part of the elongated plate P2 by punching after the elongated plate P2 is bent in the arc shape. More specifically, the attachment arms 226 and the divided elements 252 are formed on the inner peripheral part of the elongated plate P2 by punching after the elongated plate P2 is bent in the arc shape.

Third Embodiment

A disc brake rotor 310 in accordance with a third embodiment will be described below referring to FIGS. 20 to 22. The disc brake rotor 310 has the same configuration as the disc brake rotor 10 except for the rotor body 12. Thus, elements having substantially the same function as those in the above embodiments will be numbered the same here, and will not be described again in detail here for the sake of brevity.

Figure 20:
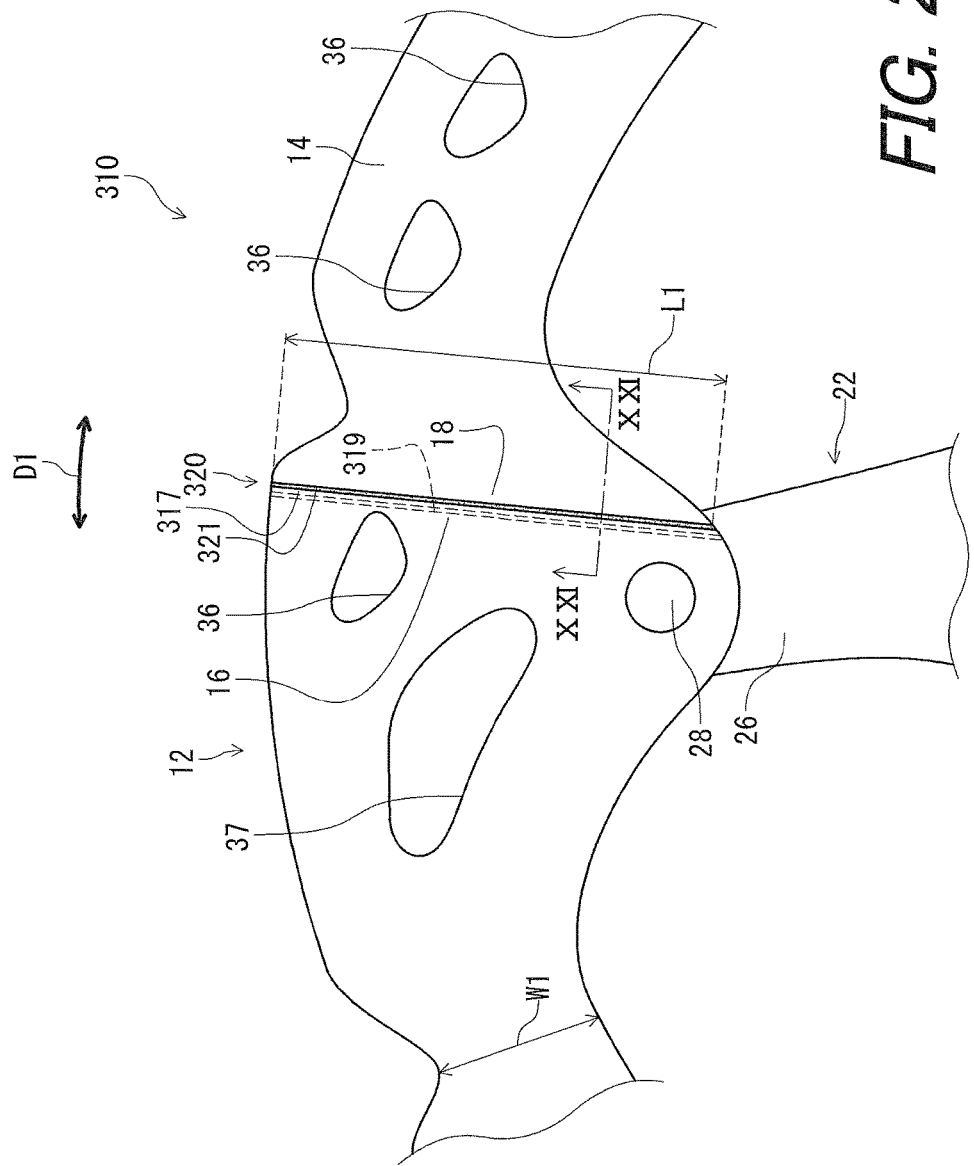
FIG. 20 is a partial enlarged view of a disc brake rotor in accordance with a third embodiment.

As seen in FIG. 20, in the disc brake rotor 310, the rotor body 12 comprises a coupling portion 320 configured to couple the at least one first end to the at least one second end to provide the annular shape of the rotor body 12. The coupling portion 320 includes at least one bonded part at which the at least one first end is bonded to the at least one second end by adhesive. In the illustrated embodiment, the coupling portion 320 includes bonded parts 321 at which the first end 16 is bonded to the second end 18 by adhesive.

Figure 21:
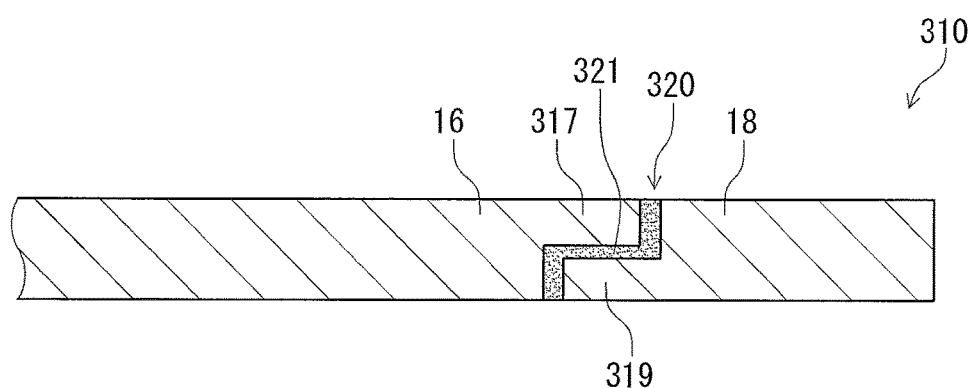
FIG. 21 is a cross-sectional view of the disc brake rotor taken along line XXI-XXI of FIG. 20.

As seen in FIG. 21, the first end 16 includes a first facing part 317. The second end 18 includes a second facing part 319. The first facing part 317 has a thickness smaller than a thickness of a part other than the first facing part 317 in the first end 16. The second facing part 319 has a thickness smaller than a thickness of a part other than the second facing part 319 in the second end 18. The first facing part 317 faces the second facing part 319. As seen in FIGS. 20 and 21, the first facing part 317 at least partially overlaps with the second facing part 319. The first facing part 317 is bonded to the second facing part 319 by adhesive.

Figure 22:
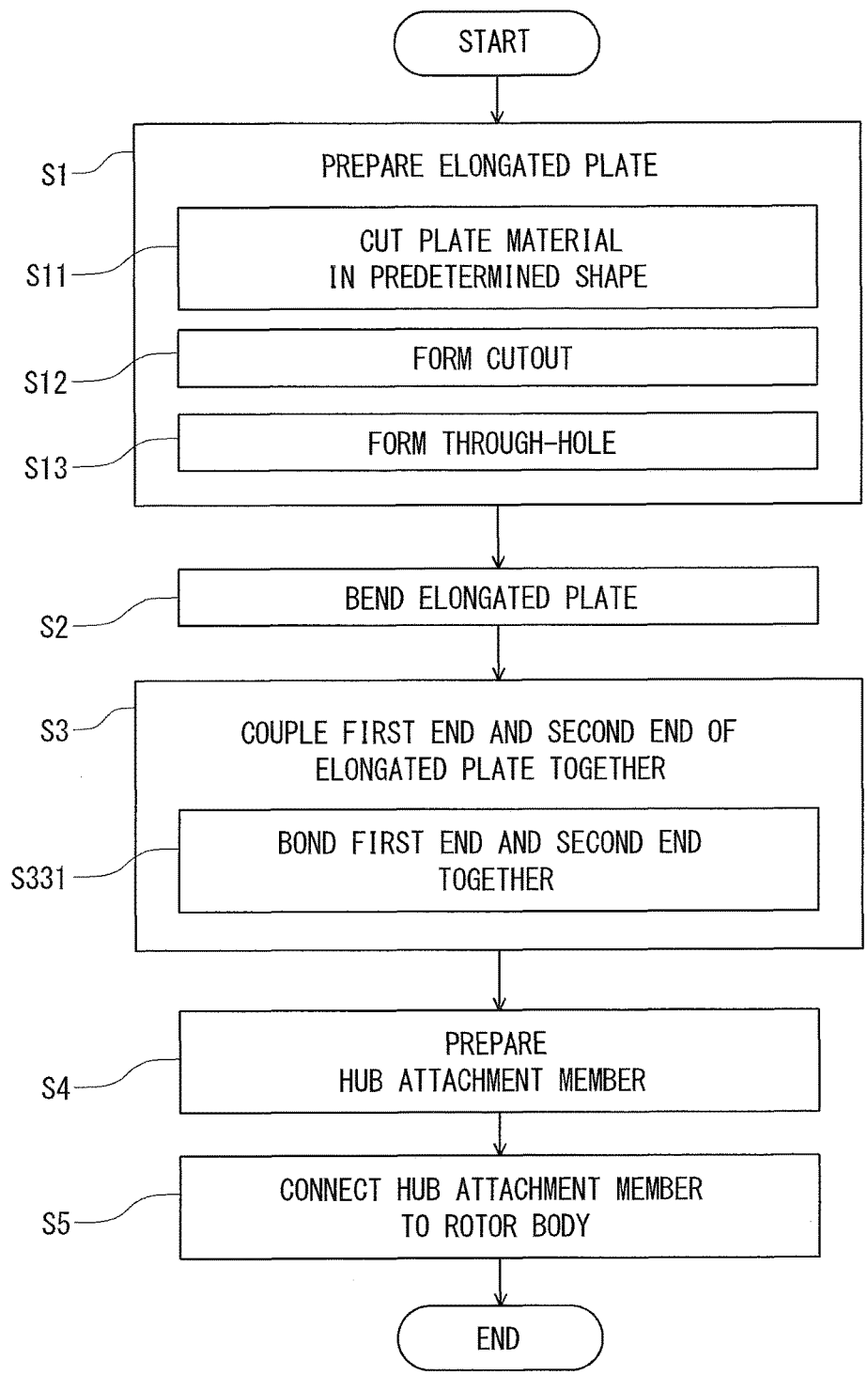
FIG. 22 is a flow chart showing a method of manufacturing the disc brake rotor illustrated in FIG. 20.

As seen in FIG. 22, in the method of manufacturing the disc brake rotor 310, the coupling of the first end 16 and the second end 18 includes bonding the first end 16 and the second end 18 together using adhesive (step S331). In the illustrated embodiment, the first facing part 317 is bonded to the second facing part 319 to provide the annular shape of the rotor body 12.

As seen in FIG. 22, since the steps other than the step S331 are substantially the same as the steps in accordance with the first embodiment (FIG. 3), they will not be described in detail here for the sake of brevity.

With the method of manufacturing the disc brake rotor 310, it is possible to obtain the same advantageous effect of the method in accordance with the first embodiment.

With the disc brake rotor 310, it is possible to obtain the same advantageous effect of the disc brake rotor 10 in accordance with the first embodiment.

Fourth Embodiment

A disc brake rotor 410 in accordance with a fourth embodiment will be described below referring to FIGS. 23 to 27. The disc brake rotor 410 has the same configuration as the disc brake rotor 10 except for the rotor body 12. Thus, elements having substantially the same function as those in the above embodiments will be numbered the same here, and will not be described again in detail here for the sake of brevity.

Figure 23:
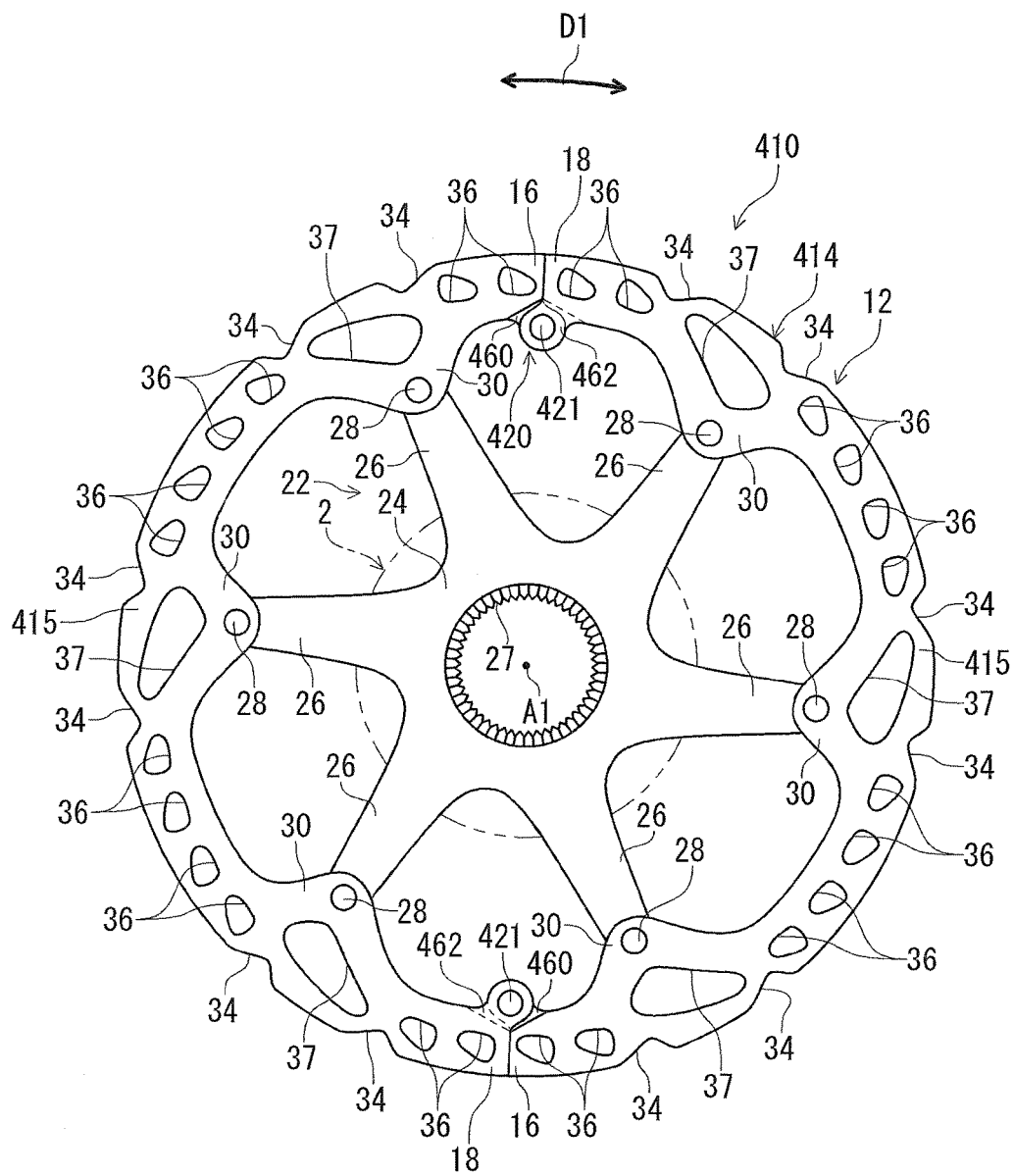
FIG. 23 is a side elevational view of a disc brake rotor in accordance with a fourth embodiment.

As seen in FIG. 23, in the disc brake rotor 410, the rotor body 12 comprises a main body 414 extending in the circumferential direction D1 of the disc brake rotor 410. The main body 414 includes at least one first end and at least one second end opposite to the at least one first end in the circumferential direction. In the illustrated embodiment, the main body 414 includes the first ends 16 and the second ends 18 opposite to the first ends 16 in the circumferential direction D1. More specifically, the main body 414 includes divided portions 415 extending in the circumferential direction D1. Each of the divided portions 415 includes the first end 16 and the second end 18 opposite to the first end 16 in the circumferential direction D1. The first end 16 of one of the divided portions 415 is coupled to the second end 18 of another of the divided portions 415. The second end 18 of one of the divided portions 415 is coupled to the first end 16 of another of the divided portions 415.

The rotor body 12 comprises a coupling portion 420 configured to couple the at least one first end to the at least one second end to provide the annular shape of the rotor body 12. The coupling portion 420 includes at least one coupling member configured to couple the at least one first end to the at least one second end. In the illustrated embodiment, the coupling portion 420 includes coupling members 421 configured to respectively couple the first ends 16 to the second ends 18. For example, the coupling members 421 are rivets. The coupling members 421 are opposite to each other relative to the rotational axis A1 of the disc brake rotor 410. The coupling members 421 are provided radially inward of the main body 414. The coupling member 421 can, however, be provided radially outward of the main body 414 if needed and/or desired.

As seen in FIG. 23, the rotor body 12 includes first coupling parts 460 and second coupling parts 462. The first coupling parts 460 are provided at the first ends 16 of the divided portions 415. The second coupling parts 462 are provided at the second ends 18 of the divided portions 415.

Figure 24:
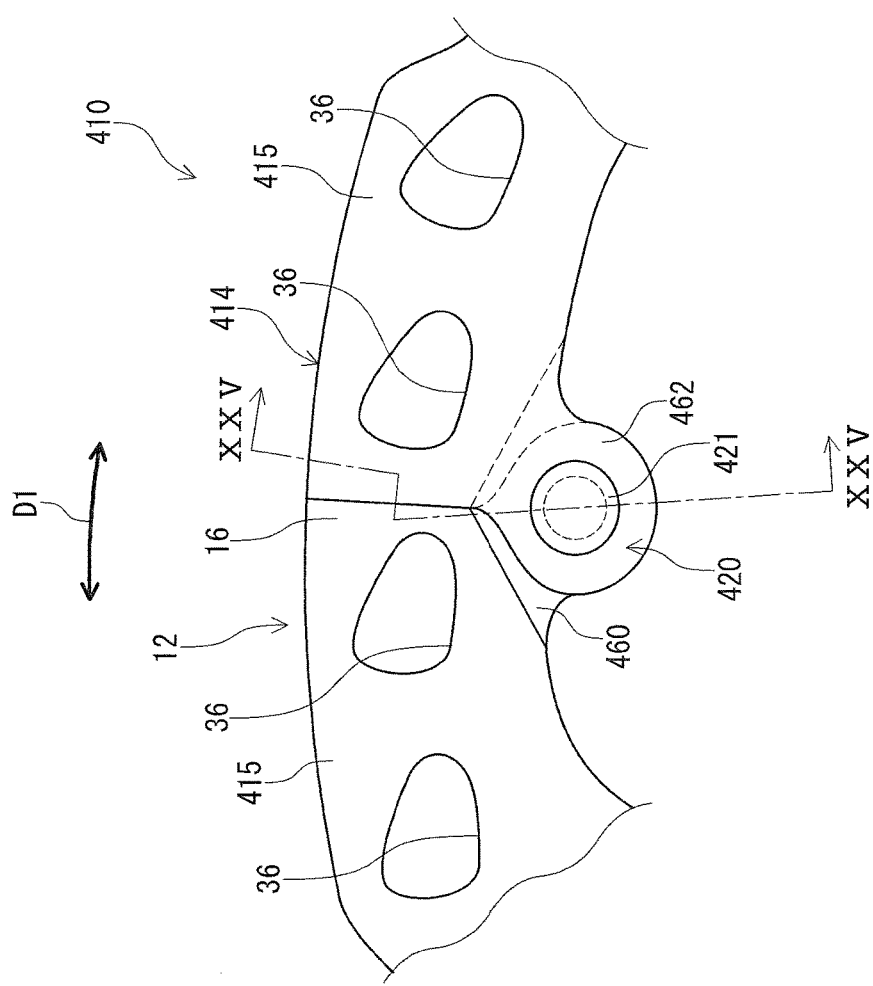
FIG. 24 is a partial enlarged view of the disc brake rotor illustrated in FIG. 23.

As seen in FIG. 24, the first coupling part 460 provided at the first end 16 of one of the divided portions 415 overlaps at least partially with the second coupling part 462 provided at the second end 18 of another of the divided portions 415. The first coupling parts 460 are disposed radially inward of the main body 414 of the rotor body 12. The second coupling parts 462 are disposed radially inward of the main body 414 of the rotor body 12.

Figure 25:
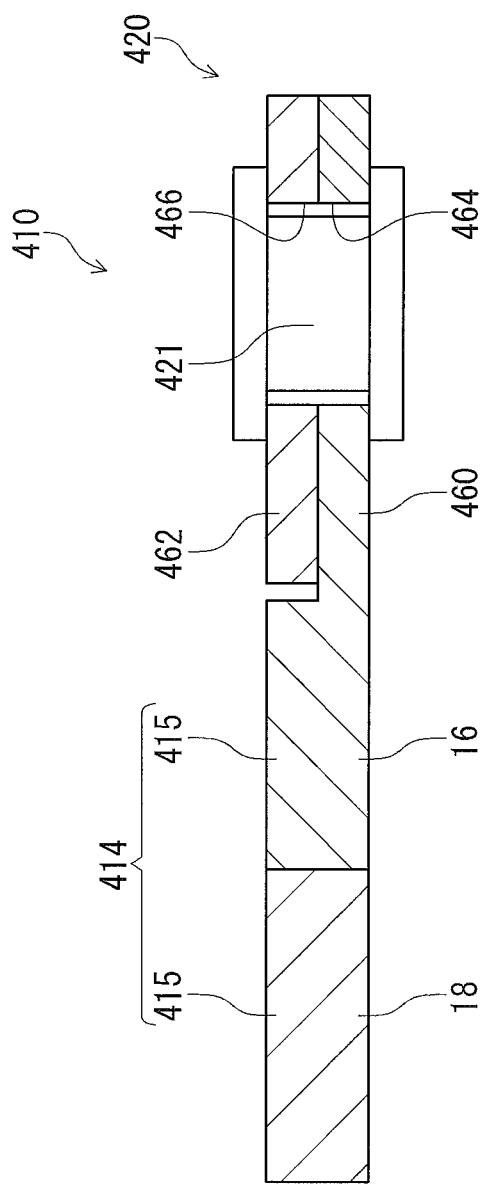
FIG. 25 is a cross-sectional view of the disc brake rotor taken along line XXV-XXV of FIG. 24.

As seen in FIG. 25, the first coupling part 460 includes a first through-hole 464. The second coupling part 462 includes a second through-hole 466. The coupling member 421 extends through the first through-hole 464 and the second through-hole 466. The first coupling part 460 has a thickness smaller than a thickness of the first end 16. The second coupling part 462 has a thickness smaller than a thickness of the second end 18. A total thickness of the first coupling part 460 and the second coupling part 462 is substantially equal to the thickness of the first end 16 or the thickness of the second end 18.

Figure 26:
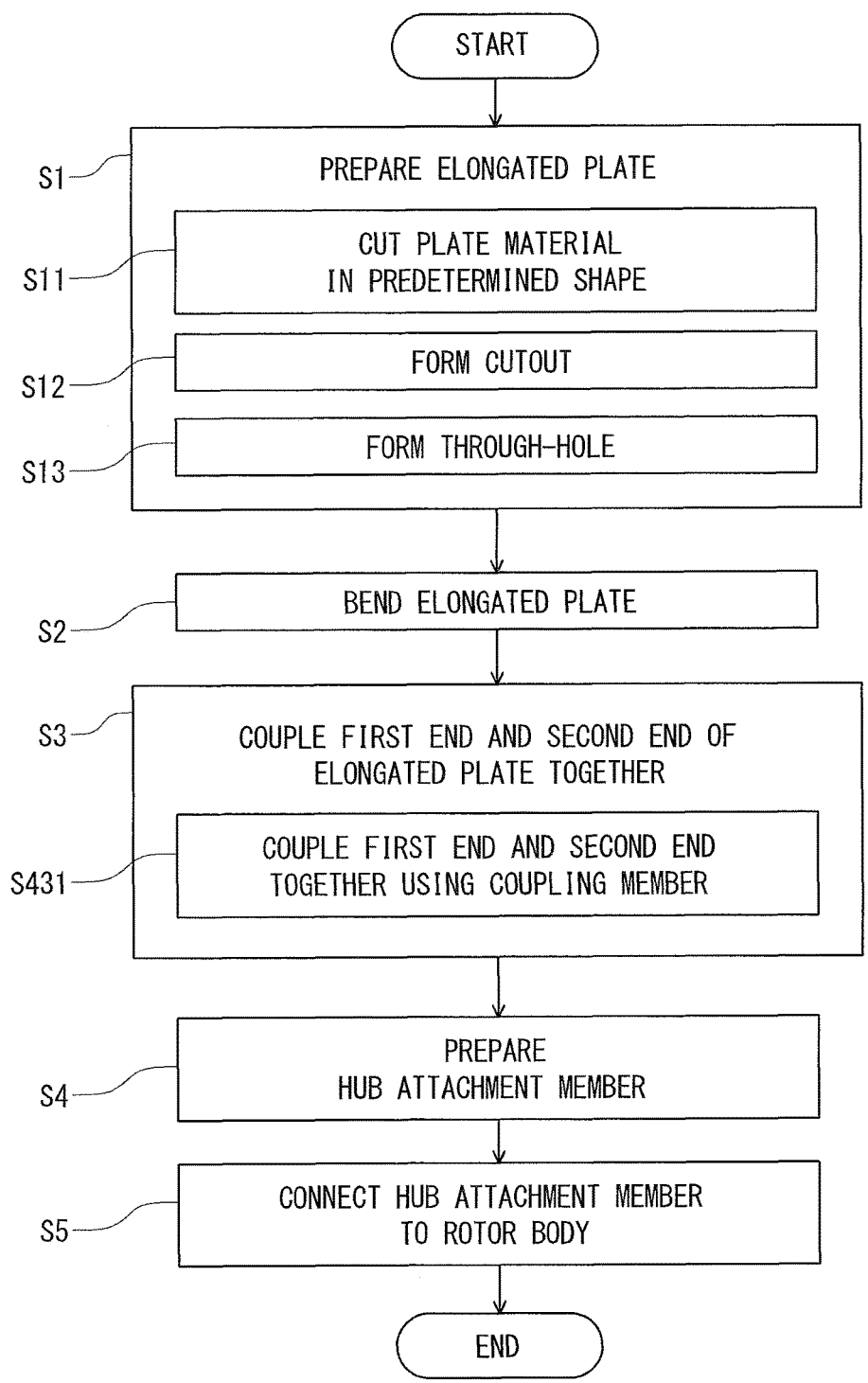
FIG. 26 is a flow chart showing a method of manufacturing the disc brake rotor illustrated in FIG. 23.
Figure 27:
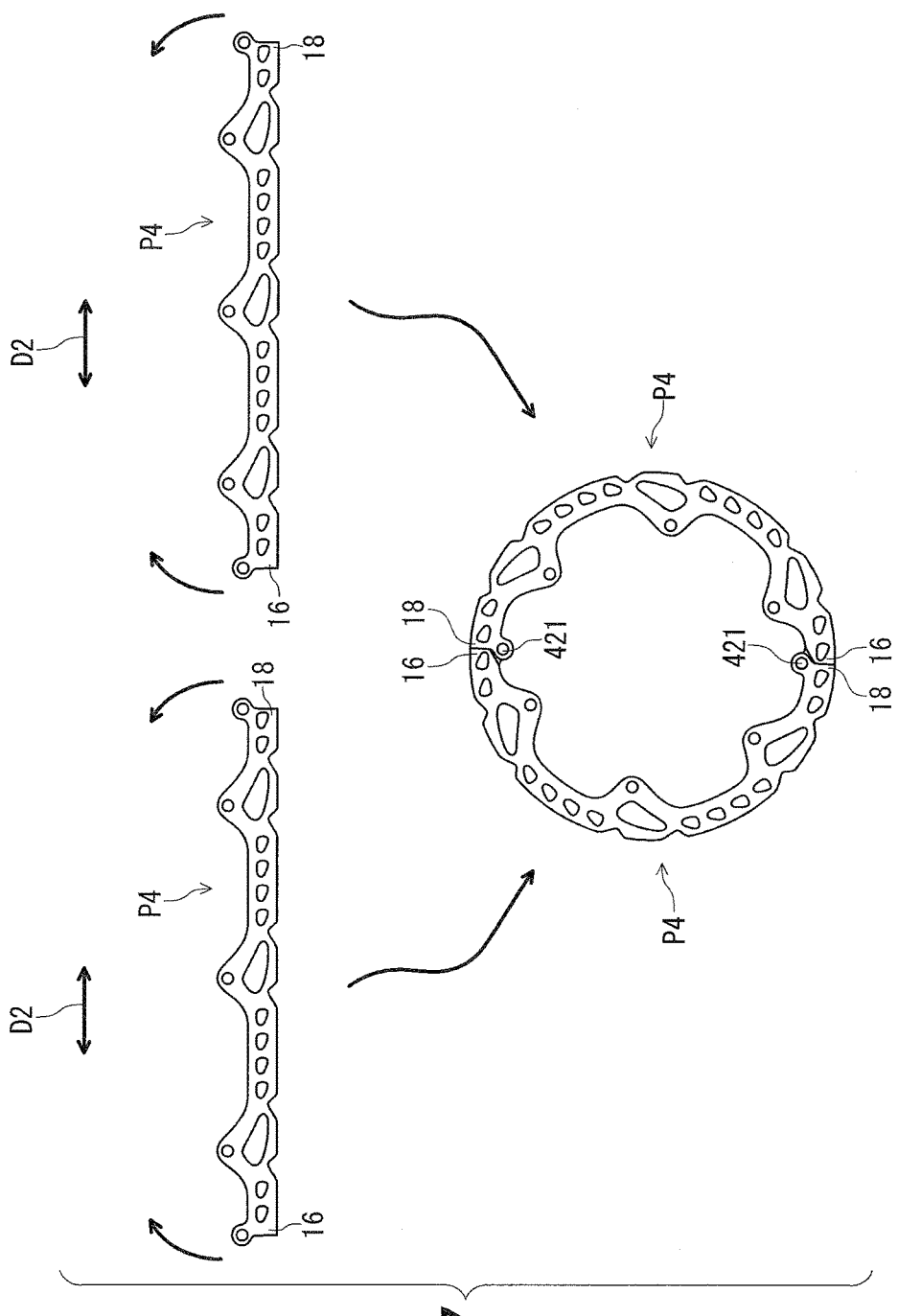
FIG. 27 is a plan view of elongated plates for explaining the method of manufacturing the disc brake rotor illustrated in FIG. 23.

As seen in FIG. 26, a method of manufacturing the disc brake rotor 410 comprises preparing at least one elongated plate (step S1). The at least one elongated plate has a first end and a second end opposite to the first end in a longitudinal direction of the at least one elongated plate. In the illustrated embodiment, as seen in FIG. 27, elongated plates P4 are prepared. The elongated plate P4 has the first end 16 and the second end 18 opposite to the first end 16 in the longitudinal direction D2 of the elongated plate P4.

As seen in FIG. 26, the method comprises bending the at least one elongated plate in an arc shape (step S2). In the illustrated embodiment, as seen in FIG. 27, the elongated plates P4 are bent in an annular shape.

As seen in FIGS. 26 and 27, the coupling of the first end 16 and the second end 18 includes coupling the first end 16 and the second end 18 together using the coupling member 421 (step S431). Since the steps other than the step S431 are substantially the same as the steps in accordance with the first embodiment (FIG. 3), they will not be described in detail here for the sake of brevity.

With the method of manufacturing the disc brake rotor 410, it is possible to obtain the same advantageous effect of the method in accordance with the first embodiment.

With the disc brake rotor 410, it is possible to obtain the same advantageous effect of the disc brake rotor 10 in accordance with the first embodiment.

Fifth Embodiment

A disc brake rotor 510 in accordance with a fifth embodiment will be described below referring to FIGS. 28 to 32. The disc brake rotor 510 has the same configuration as the disc brake rotor 10 except for the rotor body 12. Thus, elements having substantially the same function as those in the above embodiments will be numbered the same here, and will not be described again in detail here for the sake of brevity.

Figure 28:
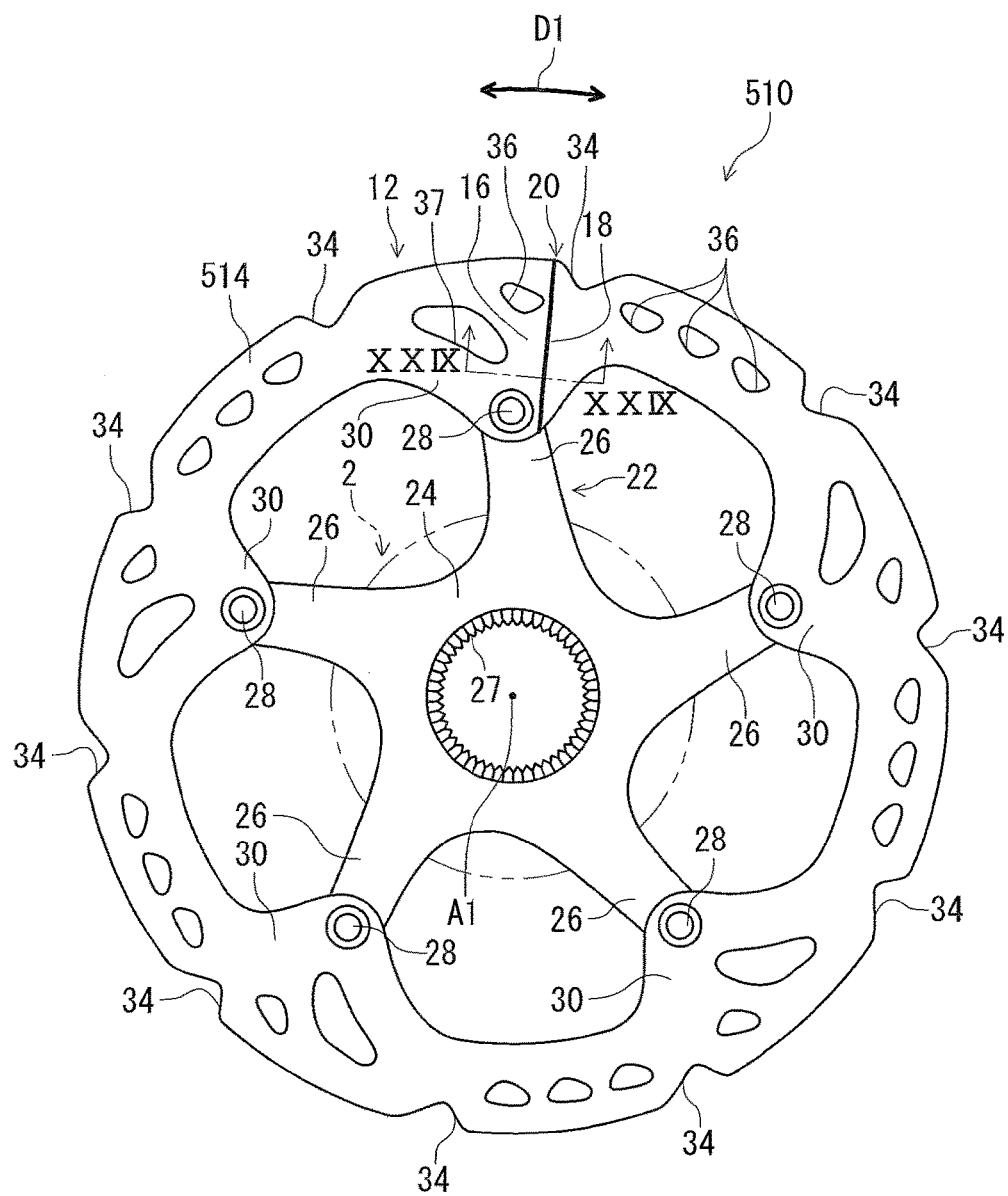
FIG. 28 is a side elevational view of a disc brake rotor in accordance with a fifth embodiment.
Figure 29:
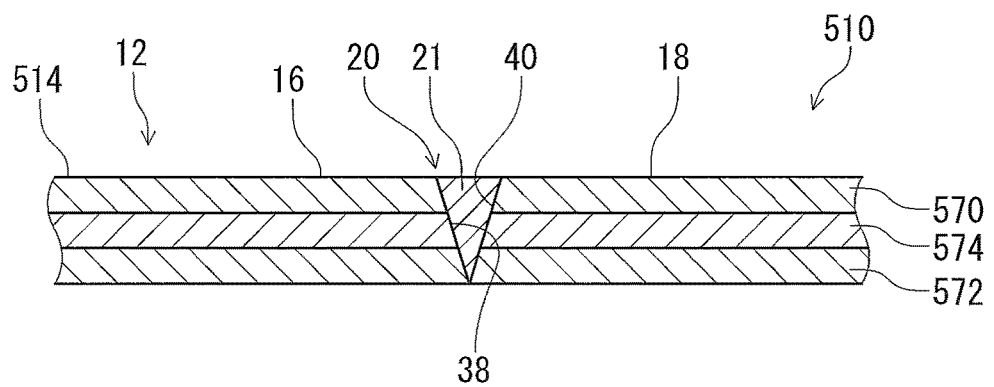
FIG. 29 is a cross-sectional view of the disc brake rotor taken along line XXIX-XXIX of FIG. 28.

As seen in FIG. 28, in the disc brake rotor 510, a main body 514 of the rotor body 12 has a multi-layered structure having different materials. As seen in FIG. 29, the main body 514 includes a first layer 570, a second layer 572, and a third layer 574. The first layer 570 is made of a first material. The second layer 572 is made of a second material. The third layer 574 is made of a third material different from the first material and the second material. The third layer 574 is provided between the first layer 570 and the second layer 572.

The first material comprises a first metallic material. The second material comprises a second metallic material. The third material comprises a third metallic material different from the first metallic material and the second metallic material. For example, the first metallic material comprises stainless steel. The second metallic material comprises stainless steel. The third metallic material comprises aluminum. The first layer 570 and the second layer 572 are bonded to the third layer 574 using diffusion bonding. The first layer 570 and the second layer 572 can be bonded to the third layer 574 using bonding material such as adhesive.

At least one of the first material, the second material, and the third material can comprise other material. For example, the third material can comprise a resin material. In such embodiment, the first layer 570 and the second layer 572 are bonded to the third material using integral molding.

Figure 30:
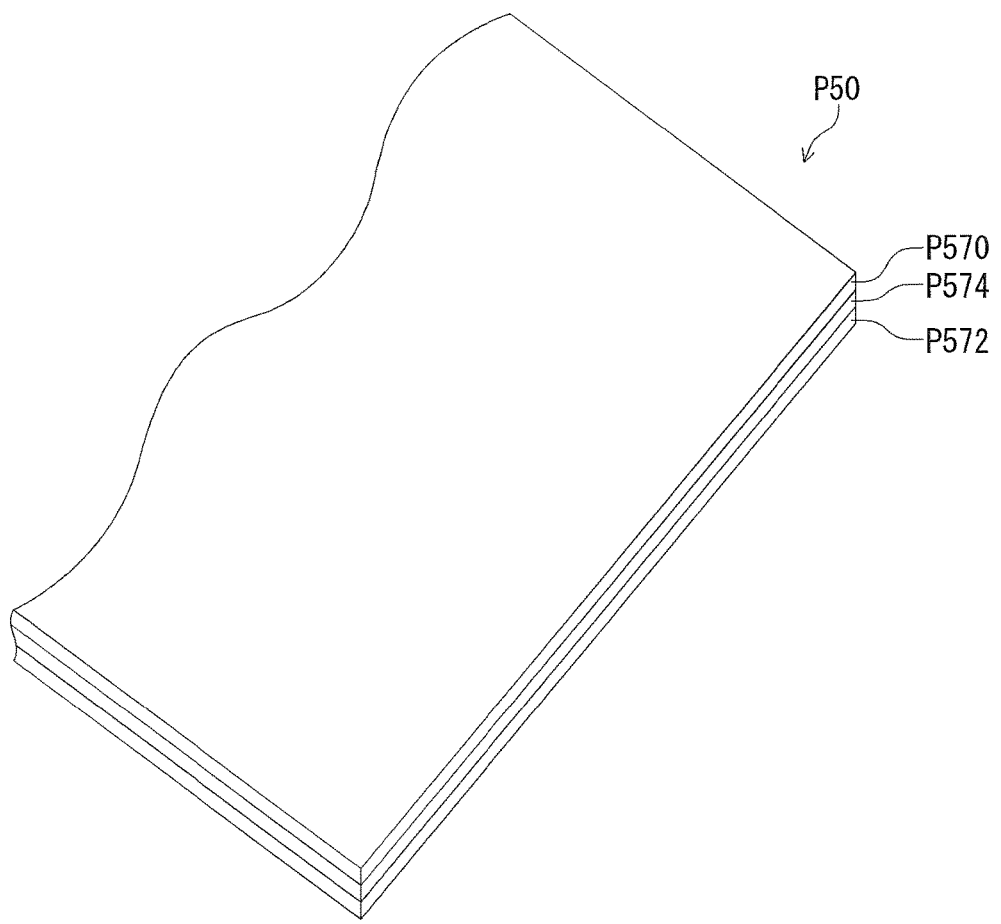
FIG. 30 is a partial perspective view of an elongated plate for explaining a method of manufacturing the disc brake rotor illustrated in FIG. 28.

As seen in FIG. 30, the rotor body 12 of the disc brake rotor 510 is made from a plate material P50. The plate material P50 has a first material layer P570, a second material layer P572, and a third material layer P574. The first material layer P570 is made of the first material. The second material layer P572 is made of the second material. The third material layer P574 is made of the third material different from the first material and the second material. The third material layer P574 is provided between the first material layer P570 and the second material layer P572. The first material layer P570, the second material layer P572, and the third material layer P574 of the plate material P50 correspond to the first layer 570, the second layer 572, and the third layer 574 of the main body 514 of the rotor body 12, respectively.

Figure 31:
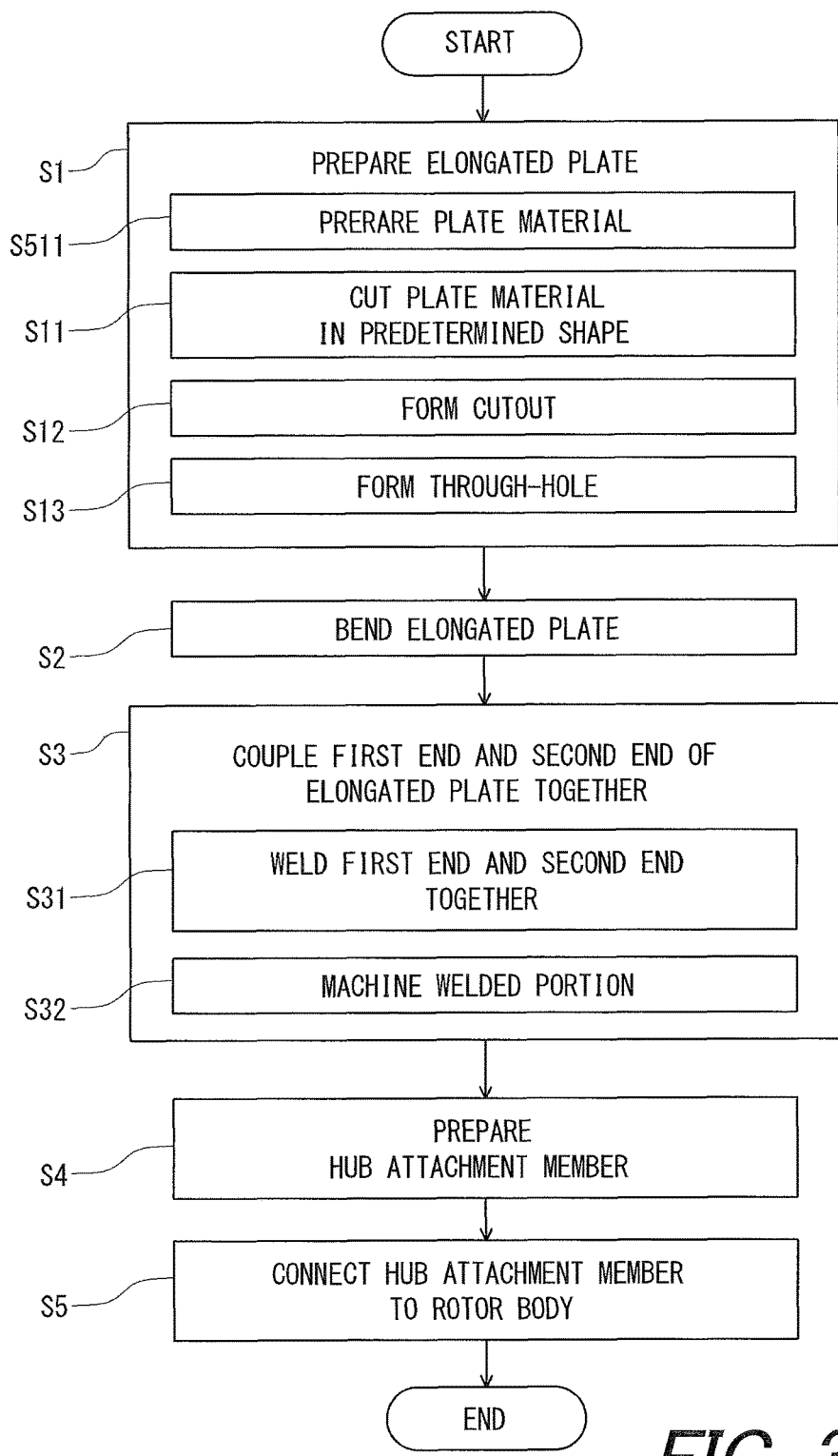
FIG. 31 is a flow chart showing a method of manufacturing the disc brake rotor illustrated in FIG. 28.
Figure 32:
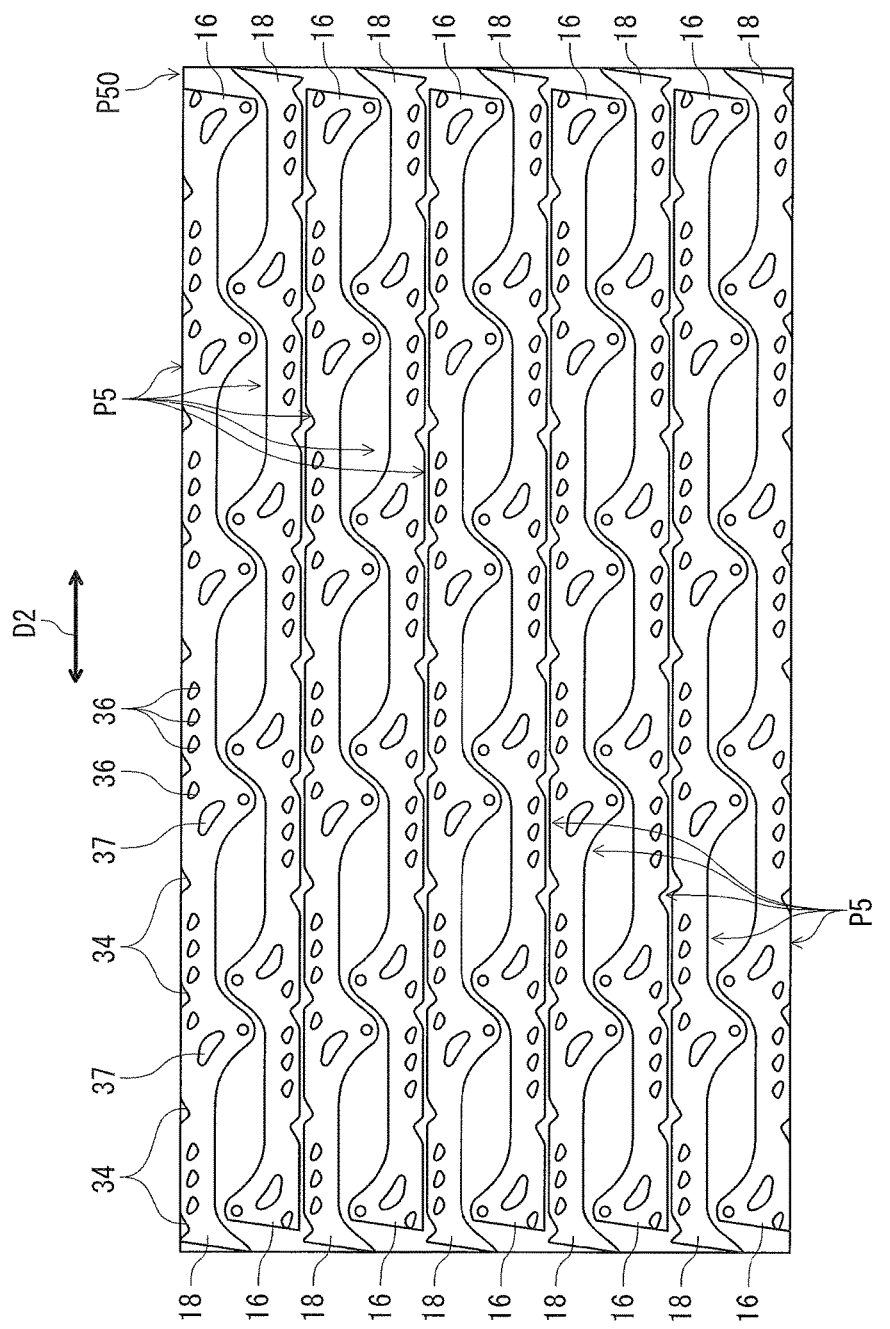
FIG. 32 is a plan view of a plate material for explaining the method of manufacturing the disc brake rotor illustrated in FIG. 28.

As seen in FIG. 31, the method of manufacturing the disc brake rotor 510 comprises preparing at least one elongated plate (step S1). In the illustrated embodiment, as seen in FIGS. 30 and 31, the plate material P50 is prepared (step S511). More specifically, the first material layer P570 and the second material layer P572 are bonded to the third material layer P574 using diffusion bonding or bonding material such as adhesive. As seen in FIGS. 31 and 32, the preparing of the at least one elongated plate includes cutting the plate material P50 in a predetermined shape to provide the at least one elongated plate (step S11). In the illustrated embodiment, as seen in FIG. 32, the plate material P50 is cut in a predetermined shape to provide the elongated plates P5 by punching.

As seen in FIG. 31, since the steps other than the step S511 are substantially the same as the steps in accordance with the first embodiment (FIG. 3), they will not be described in detail here for the sake of brevity.

With the method of manufacturing the disc brake rotor 510, it is possible to obtain the same advantageous effect of the method in accordance with the first embodiment.

With the disc brake rotor 510, it is possible to obtain the same advantageous effect of the disc brake rotor 10 in accordance with the first embodiment.

Sixth Embodiment

A disc brake rotor 610 in accordance with a sixth embodiment will be described below referring to FIGS. 33 to 35. The disc brake rotor 610 has the same configuration as the disc brake rotor 10 except for the rotor body 12. Thus, elements having substantially the same function as those in the above embodiments will be numbered the same here, and will not be described again in detail here for the sake of brevity.

Figure 33:
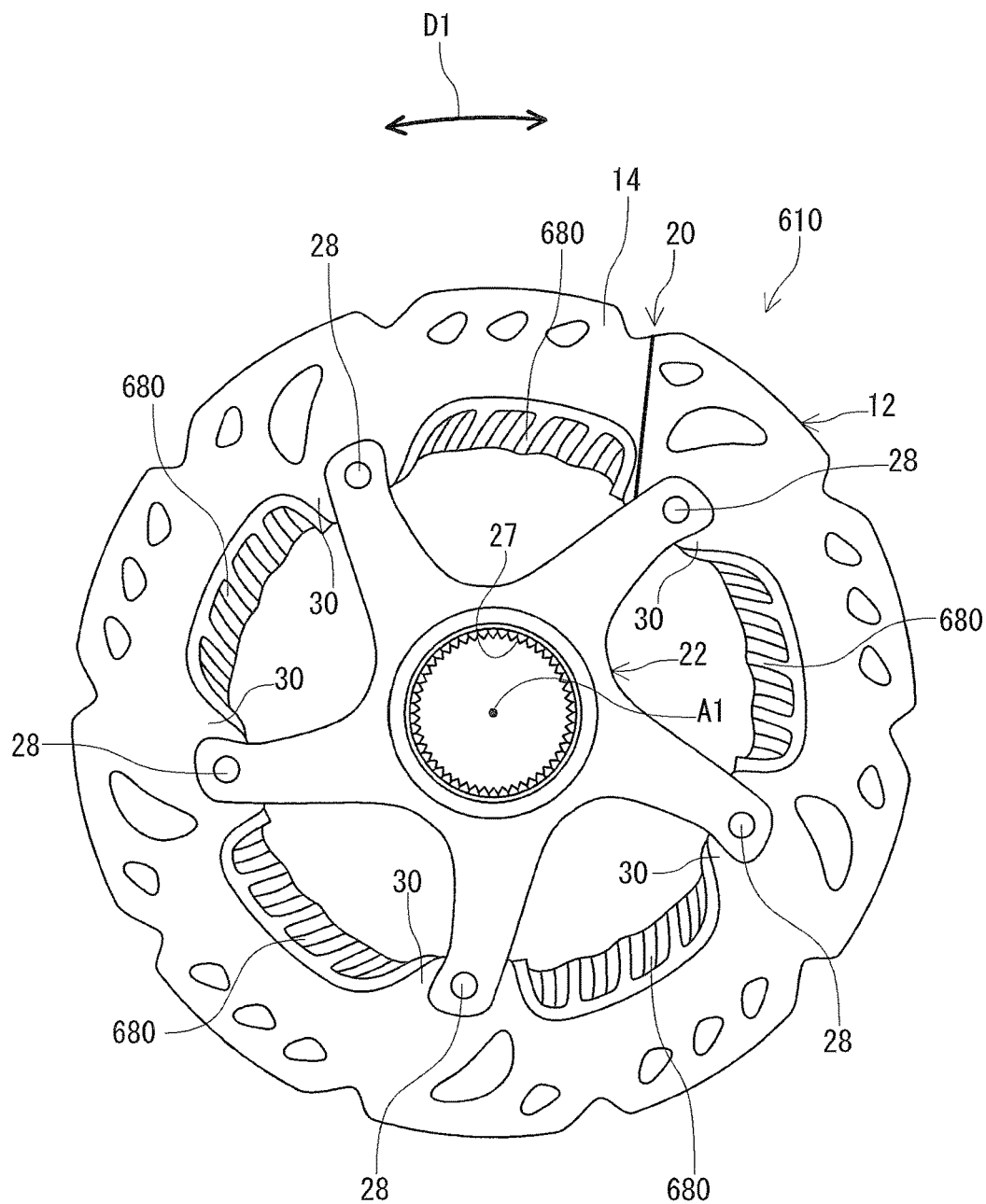
FIG. 33 is a side elevational view of a disc brake rotor in accordance with a sixth embodiment.
Figure 34:
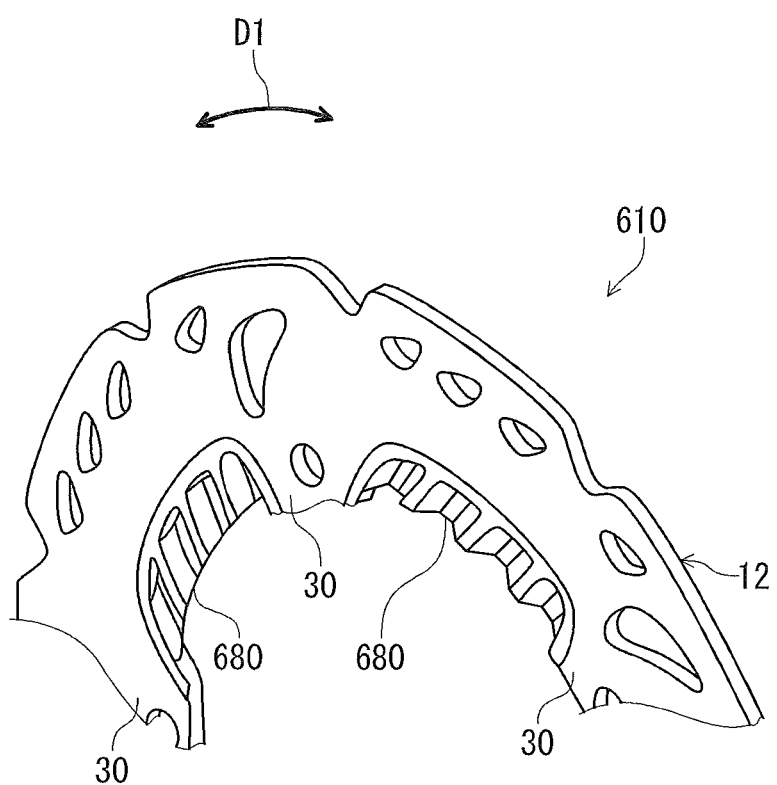
FIG. 34 is a partial perspective view of the disc brake rotor illustrated in FIG. 33.

As seen in FIG. 33, in the disc brake rotor 610, the rotor body 12 comprises at least one cooling fin part disposed on an inner peripheral part of the main body 14. In the illustrated embodiment, the rotor body 12 comprises cooling fin parts 680 disposed on the inner peripheral part of the main body 14. The cooling fin parts 680 are arranged in the circumferential direction D1 of the disc brake rotor 610. The cooling fin part 680 is disposed between and adjacent to the connecting parts 30 of the rotor body 12. As seen in FIG. 34, each of the cooling fin parts 680 has a corrugated shape.

Figure 35:
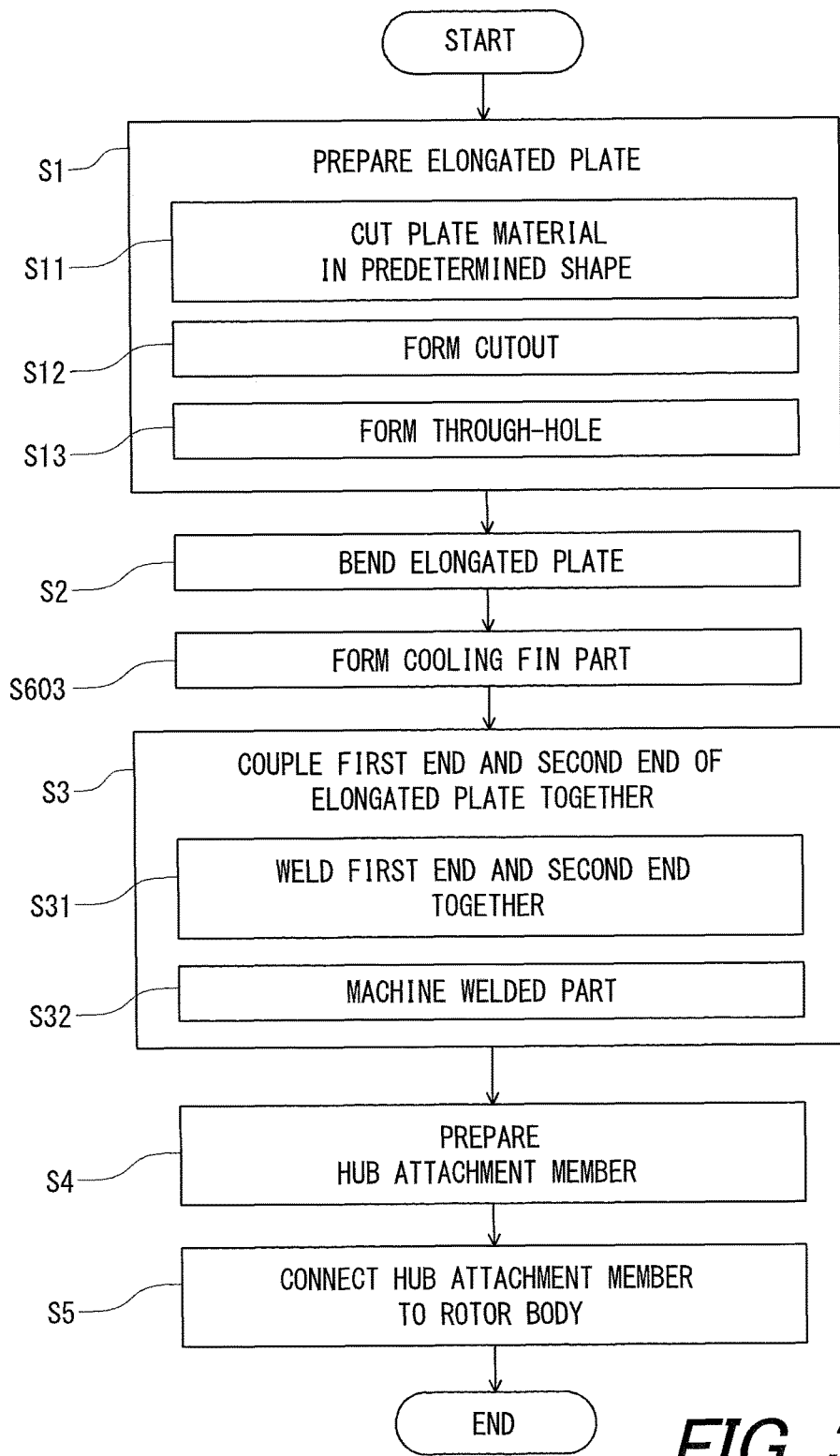
FIG. 35 is a flow chart showing a method of manufacturing the disc brake rotor illustrated in FIG. 33.

As seen in FIG. 35, the method of manufacturing the disc brake rotor 610 further comprises forming a cooling fin part on an inner peripheral part of the at least one elongated plate (step S603). In the illustrated embodiment, the cooling fin parts 680 are formed on the inner peripheral part of the elongated plate P1 by press working. For example, the cooling fin parts 680 are formed after the elongated plate P1 is bent in the arc shape. The cooling fin parts 680 can, however, be formed when the elongated plate P1 is bend in the arc shape or before the elongated plate P1 is bent in the arc shape.

With the method of manufacturing the disc brake rotor 610, it is possible to obtain the same advantageous effect of the method in accordance with the first embodiment.

With the disc brake rotor 610, it is possible to obtain the same advantageous effect of the disc brake rotor 10 in accordance with the first embodiment.

It will be apparent to those skilled in the bicycle field from the present disclosure that constructions of the above embodiments can be combined if needed and/or desired.

In the present application, the term "attached" or "attaching", as used herein, can encompass configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a disc brake rotor, comprising:
    preparing at least one elongated plate having a first end and a second end opposite to the first end in a longitudinal direction of the at least one elongated plate, the preparing of the at least one elongated plate includes forming a plurality of through-holes on the at least one elongated plate;
    bending the at least one elongated plate in an arc shape, the bending of the at least one elongated plate includes bending the at least one elongated plate so that the first end comes close to the second end; and
    coupling the first end and the second end of the at least one elongated plate together to provide a coupling portion which is configured to couple the first end to the second end of the at least one elongated plate together to provide a rotor body and which is disposed between adjacent two holes of the plurality of through-holes, wherein the coupling portion extends along a radial direction of the disc brake rotor and has a first length defined along the radial direction, and wherein the first length is shorter than a maximum radial length of the rotor body.

2. The method according to claim 1, wherein the rotor body has an annular shape.

3. The method according to claim 2, wherein
the coupling of the first end and the second end includes welding the first end and the second end together.

4. The method according to claim 3, further comprising:
machining a welded part at which the first end and the second end are welded together in the coupling of the first end and the second end.

5. The method according to claim 2, wherein
the coupling of the first end and the second end includes bonding the first end and the second end together using adhesive.

6. The method according to claim 2, wherein
the coupling of the first end and the second end includes coupling the first end and the second end together using a coupling member.

7. The method according to claim 1, wherein
the preparing of the at least one elongated plate includes cutting a plate material in a predetermined shape to provide the at least one elongated plate.

8. The method according to claim 7, wherein
the plate material has
a first material layer made of a first material,
a second material layer made of a second material, and
a third material layer made of a third material different from the first material and the second material and provided between the first material layer and the second material layer.

9. The method according to claim 1, wherein
the preparing of the at least one elongated plate includes forming a hub attachment portion configured to be attached to a bicycle hub assembly, and
the bending of the at least one elongated plate includes bending the at least one elongated plate so that the hub attachment portion is disposed on an inner peripheral part of the at least one elongated plate.

10. The method according to claim 1, further comprising:
forming, on an inner peripheral part of the at least one elongated plate, a hub attachment portion configured to be attached to a bicycle hub assembly after the at least one elongated plate is bent in the arc shape.

11. The method according to claim 1, further comprising:
forming a cooling fin part on an inner peripheral part of the at least one elongated plate.

12. The method according to claim 1, wherein
the preparing of the at least one elongated plate includes forming at least one cutout on the at least one elongated plate, and
the bending of the at least one elongated plate includes bending the at least one elongated plate so that the at least one cutout is disposed on an outer peripheral part of the at least one elongated plate.

13. The method according to claim 2, wherein
the coupling portion extends to be inclined relative to a radial direction of the disc brake rotor.

14. A disc brake rotor comprising:
a rotor body having an annular shape and comprising:
a main body extending in a circumferential direction of the disc brake rotor and including at least one first end and at least one second end opposite to the at least one first end in the circumferential direction, the main body including a plurality of through-holes; and
a coupling portion configured to couple the at least one first end to the at least one second end and disposed between adjacent two holes of the plurality of through-holes,
wherein the coupling portion extends along a radial direction of the disc brake rotor and has a first length defined along the radial direction from an inner surface of the main body to an outer surface of the main body, and
wherein the first length is shorter than a maximum radial width of the rotor body.

15. The disc brake rotor according to claim 14, wherein
the coupling portion is configured to couple the at least one first end to the at least one second end to provide the annular shape of the rotor body.

16. The disc brake rotor according to claim 15, wherein
the coupling portion includes at least one bonded part at which the at least one first end is bonded to the at least one second end by adhesive.

17. The disc brake rotor according to claim 15, wherein
the coupling portion includes at least one coupling member configured to couple the at least one first end to the at least one second end.

18. The disc brake rotor according to claim 14, wherein
the main body has a multi-layered structure having different materials, and
the main body includes
a first layer made of a first material,
a second layer made of a second material, and
a third layer made of a third material different from the first material and the second material and provided between the first layer and the second layer.

19. The disc brake rotor according to claim 18, wherein
the first material comprises a first metallic material,
the second material comprises a second metallic material, and
the third material comprises a third metallic material different from the first metallic material and the second metallic material.

20. The disc brake rotor according to claim 18, wherein
the first material comprises a first metallic material,
the second material comprises a second metallic material, and
the third material comprises a resin material.

21. The disc brake rotor according to claim 15, wherein
the main body has a minimum radial width defined along the radial direction, and
the first length is longer than the minimum radial width.

22. The disc brake rotor according to claim 14, further comprising:
a hub attachment member configured to couple an inner peripheral part of the rotor body to a bicycle hub assembly.

23. The disc brake rotor according to claim 14, wherein
the rotor body comprises a hub attachment portion configured to be attached to a bicycle hub assembly.

24. The disc brake rotor according to claim 14, wherein
the rotor body includes at least one cutout provided on an outer peripheral part of the rotor body.

25. The disc brake rotor according to claim 14, wherein
the rotor body comprises at least one cooling fin part disposed on an inner peripheral part of the main body.

26. The disc brake rotor according to claim 14, wherein the coupling portion extends to be inclined relative to a radial direction of the disc brake rotor.

27. The disc brake rotor according to claim 15, wherein the at least one first end and the at least one second end are coupled together by the coupling portion along an entirety of the coupling portion from the inner surface of the main body to the outer surface of the main body.

28. A disc brake rotor comprising:
- a rotor body having an annular shape and comprising:
  - a main body extending in a circumferential direction of the disc brake rotor and including at least one first end and at least one second end opposite to the at least one first end in the circumferential direction, the main body including a plurality of through-holes; and
  - a coupling portion configured to couple the at least one first end to the at least one second end and disposed between adjacent two holes of the plurality of through-holes,
- wherein the coupling portion extends along a radial direction of the disc brake rotor and has a first length defined along the radial direction,
- wherein the first length is shorter than a maximum radial width of the rotor body, and
- wherein the coupling portion includes at least one welded part at which the at least one first end is welded to the at least one second end.

* * * * *